US012205100B2

(12) United States Patent
Caldwell

(10) Patent No.: US 12,205,100 B2
(45) Date of Patent: Jan. 21, 2025

(54) PAYMENT PROCESSING

(71) Applicant: MX Technologies, Inc., Lehi, UT (US)

(72) Inventor: John Ryan Caldwell, Lehi, UT (US)

(73) Assignee: MX Technologies, Inc., Lehi, UT (US)

( * ) Notice: Subject to any disclaimer, the term of this patent is extended or adjusted under 35 U.S.C. 154(b) by 0 days.

(21) Appl. No.: 17/152,667

(22) Filed: Jan. 19, 2021

(65) Prior Publication Data

US 2021/0241256 A1    Aug. 5, 2021

Related U.S. Application Data

(60) Provisional application No. 62/980,899, filed on Feb. 24, 2020, provisional application No. 62/962,172, filed on Jan. 16, 2020.

(51) Int. Cl.
*G06Q 20/40* (2012.01)
*G06Q 20/08* (2012.01)
*G06Q 20/32* (2012.01)
*G06Q 20/38* (2012.01)
*G06Q 20/12* (2012.01)

(52) U.S. Cl.
CPC ..... *G06Q 20/3223* (2013.01); *G06Q 20/0855* (2013.01); *G06Q 20/3224* (2013.01); *G06Q 20/3278* (2013.01); *G06Q 20/385* (2013.01); *G06Q 20/403* (2013.01); *G06Q 20/12* (2013.01)

(58) Field of Classification Search
CPC .............................................. G06Q 20/3223
USPC ......................................................... 705/41
See application file for complete search history.

(56) References Cited

U.S. PATENT DOCUMENTS

2009/0171852 A1\* 7/2009 Taylor ................. G06Q 20/027
 705/79
2011/0320347 A1\* 12/2011 Tumminaro ....... G06Q 20/0855
 705/39

(Continued)

FOREIGN PATENT DOCUMENTS

EP    2866186 A1 \* 4/2015 ......... G06Q 20/3221
JP    2006-004264    1/2006

(Continued)

OTHER PUBLICATIONS

Authors: Marc Pasquet: Instant payment versus smartphone payment: The big fight ?: Date of Conference: Feb. 11-12, 2017; Date Added to IEEE Xplore: Mar. 27, 2017; (Year: 2017).\*

(Continued)

*Primary Examiner* — Bruce I Ebersman
*Assistant Examiner* — Hatem M Ali
(74) *Attorney, Agent, or Firm* — Kunzler Bean & Adamson

(57) ABSTRACT

Apparatuses, methods, computer program products, and systems are disclosed for payment processing. An apparatus includes one or more processors and one or more memories that store code executable by the one or more processors to exchange payment information for a transaction wirelessly between a mobile hardware computing device of a user and a hardware payment terminal for a merchant, to validate an availability of funds for the transaction using an electronic interface for an account for the user at a third-party institution, and to electronically transfer the funds directly from the account for the user to an account for the merchant to complete the transaction.

13 Claims, 9 Drawing Sheets

(56) References Cited

U.S. PATENT DOCUMENTS

| | | | | |
|---|---|---|---|---|
| 2012/0290449 A1* | 11/2012 | Mullen | ............. | G06Q 20/3278 |
| | | | | 705/26.1 |
| 2014/0019352 A1 | 1/2014 | Shrivastava | | |
| 2017/0169418 A1 | 6/2017 | Bellenger et al. | | |
| 2018/0018647 A1* | 1/2018 | Fredman | ................ | G06Q 50/22 |
| 2019/0043038 A1 | 2/2019 | Jang et al. | | |
| 2020/0027076 A1* | 1/2020 | Sharma | ............. | G06Q 20/3278 |

FOREIGN PATENT DOCUMENTS

| | | | | |
|---|---|---|---|---|
| JP | 2016-504661 | | 2/2016 | |
| JP | 2016-173752 | | 9/2016 | |
| WO | WO-2010061002 A1 * | 6/2010 | ......... | G06K 19/0718 |

OTHER PUBLICATIONS

Authors: S.Von Solms: An investigation into credit card information disclosure through Point of Sale purchases; Date of Conference: Aug. 12-13, 2015; Date Added to IEEE Xplore: Nov. 23, 2015 (Year: 2015).*

Authors: Marc Pasquet: Instant payment versus smartphone payment: The big fight ?: Date of Conference: Feb. 11-12, 2017; (Year: 2017).*

Authors: S.Von Solms: An investigation into credit card information disclosure through Point of Sale purchases; Date of Conference: Aug. 12-13, 2015; Date Added to IEEE Xplore: Nov. 23, 2015 (Year: 2015) (Year: 2015).*

PCT Patent Application PCT/US2021/014011 International Search Report, Jul. 28, 2022.

EP Patent Application 81.68.156306 Search Report, Sep. 20, 2022.

PCT Patent Application PCT/US2021/014011 International Search Report, Apr. 2, 2021.

IN Patent Application 202117048800 Search Report, Sep. 6, 2022.

AU Patent Application 2021208013 Search Report, Nov. 4, 2022.

JP Patent Application 2021-564475 Office Action, Sep. 29, 2023.

CA Patent Application 3,138,222 Office Action, Jan. 3, 2024.

JP Patent Application 2021-564475 Office Action, Jan. 15, 2024.

* cited by examiner

PAYMENT PROCESSING

CROSS-REFERENCES TO RELATED APPLICATIONS

This application claims the benefit of U.S. Provisional patent Application No. 62/962,172 entitled "PAYMENT PROCESSING" and filed on Jan. 16, 2020 and to U.S. Provisional Patent Application No. 62/980,899 entitled "PAYMENT PROCESSING" and filed on Feb. 24, 2020, both for John Ryan Caldwell, both of which are incorporated herein by reference in their entirety for all purposes.

FIELD

This invention relates to payment processing and more particularly relates to aggregation based mobile device payment processing networks.

BACKGROUND

Currently, merchants are often limited to card-based payment networks. While historically card-based payments have been convenient, fraud and fees may be problematic for merchants.

BRIEF SUMMARY

Apparatuses, systems, methods, and computer program products are disclosed for payment processing. An apparatus, in one embodiment, includes one or more processors and one or more memories that store code executable by the one or more processors to exchange payment information for a transaction wirelessly between a mobile hardware computing device of a user and a hardware payment terminal for a merchant, to validate an availability of funds for the transaction using an electronic interface for an account for the user at a third-party institution, and/or to electronically transfer the funds directly from the account for the user to an account for the merchant to complete the transaction.

A method, in one embodiment, includes exchanging non-card-based payment information for a transaction between a hardware computing device of a user and a hardware payment device for a merchant. In certain embodiments, a method includes validating an availability of funds for a transaction using an electronic interface for an account for a user at a third-party institution. An electronic interface, in some embodiments, comprises an application programming interface and/or a hypertext markup language web interface for a third-party institution. A method, in a further embodiment, includes electronically transferring funds directly from an account for a user to an account for a merchant to complete a transaction.

An apparatus, in one embodiment, includes means for exchanging payment information for a transaction electronically between a hardware computing device of a user and a hardware payment device for a merchant. In a further embodiment, an apparatus includes means for validating an availability of funds for a transaction using an electronic interface for an account for a user at a third-party institution. An apparatus, in certain embodiments, includes means for electronically transferring funds directly from an account for a user to an account for a merchant to complete a transaction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
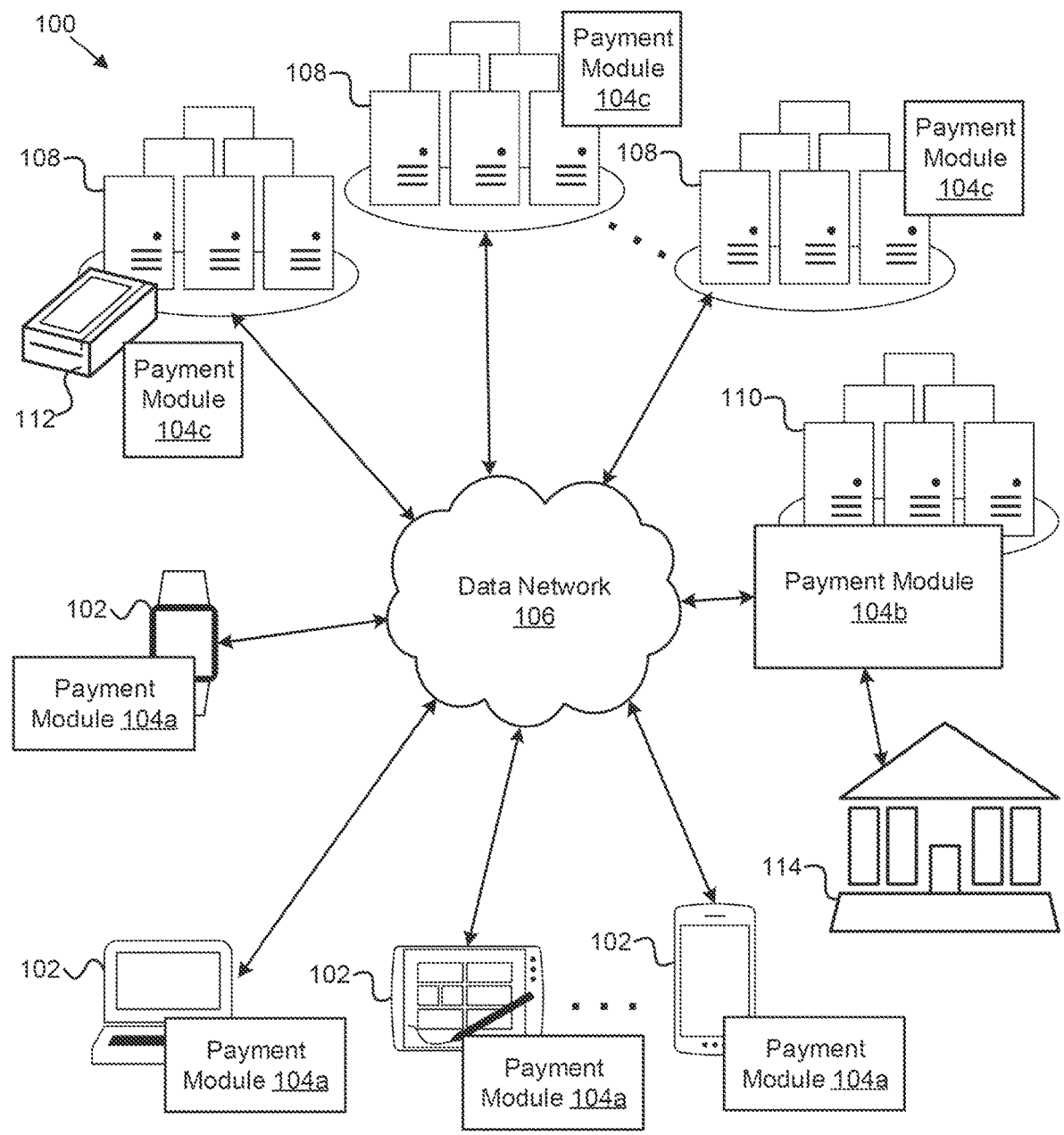
FIG. 1 is a schematic block diagram illustrating one embodiment of a system for payment processing.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware computing devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for payment processing. In one embodiment, the system 100 includes one or more hardware computing devices 102, one or more payment modules 104 (e.g., a backend payment module 104*b*, a plurality of payment modules 104*a* disposed on the one or more hardware computing devices 102, one or more merchant payment modules 104*c* for one or more merchants 108 and/or other third-party entities 108), one or more data networks 106 or other communication channels, one or more third-party entities 108 (e.g., one or more servers 108 of one or more merchants 108 or other third-party entities 108; one or more cloud or network service providers; or the like), and/or one or more backend servers 110. In certain embodiments, even though a specific number of hardware computing devices 102, payment modules 104, data networks 106, third-party entities 108, and/or backend servers 110 are depicted in FIG. 1, one of skill in the art will recognize, in light of this disclosure, that any number of hardware computing devices 102, payment modules 104, data networks 106, third-party entities 108, and/or backend servers 110 may be included in the system 100 for payment processing.

In one embodiment, the system 100 includes one or more hardware computing devices 102. The hardware computing devices 102 (e.g., mobile hardware computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware computing devices 102 are in communication with one or more servers 108 of one or more third-party entities 108 and/or one or more backend servers 110 via a data network 106, described below. The hardware computing devices 102, in a further embodiment, are capable of executing various programs, program code, applications, instructions, functions, or the like.

In one embodiment, a payment module 104 is configured to facilitate a payment between a user's hardware computing device 102 and a hardware payment device 112 (e.g., a hardware payment terminal 112, a payment server computing device 108, or the like) for a third-party entity 108 (e.g., a merchant, a store, a service provider, another user, a website, and/or another entity). For example, in some embodiments, a user may pay in-person (e.g., at a merchant 108's physical location) using a mobile hardware computing device 102 of the user and a hardware payment terminal 112 for the merchant 108. In a further embodiment, a user may pay online (e.g., through a website and/or an executable application for a merchant 108 or other third-party entity 108, or the like) from a hardware computing device 102 for the user in communication with a payment server computing device 108 for the merchant 108 over a data network 106.

In certain embodiments, instead of or in addition to facilitating a card-based transaction (e.g., based on a credit and/or debit card number, read from a chip and/or magnetic strip, extracted from a photo of the card, and/or manually entered), a payment module 104 is configured to facilitate a user (e.g., a person, a business, and/or another entity) based transaction (e.g., based on an account for and/or identify of the user being authenticated by a payment module 104*a* executing on a hardware computing device 102 of the user, or the like).

For example, while a credit card, a debit card, a prepaid card, or the like may be used as a funding source by a payment module 104 (e.g., or another financial account, such as a checking account, savings account, or the like), in some embodiments, the payment module 104 may complete a transaction based on aggregated transaction data for the selected funding source (e.g., determining an availability of funds and/or credit based on aggregated transaction data, communicating directly with a core system and/or other electronic interface of a card issuing financial institution 114, or the like), bypassing and/or postponing interaction with a card-based payment network for the funding source. In this manner, in certain embodiments, a payment module 104 may replace a payment card in a transaction with a user's identity, authenticated on a hardware computing device 102 for the user (e.g., a user's mobile telephone device 102 or the like), verifying funds and directly transferring funds electronically (e.g., using an electronic funds transfer (ETF), an automatic clearing house (ACH) electronic payment, a real-time gross settlement (RTGS) transfer, a wire transfer, a giro transfer, or the like) instead of using a card-based payment network and requiring participation by an issuing financial institution for a card, an acquiring financial institution for a merchant, interchange fees, extended float periods before receiving payments, or the like.

While a payment module 104 may support credit card and/or other card-based transactions (e.g., using a third-party card-based payment network, or the like), in some embodiments, in order to reduce transaction fees for the third-party entity 108 for the transaction (e.g., the merchant 108 or other third-party entity 108), to expedite the transaction, or the like, the payment module 104 may support one or more other payment types for a user, such as an electronic funds transfer (ETF), an ACH electronic payment (e.g., an ACH direct debit collection, an ACH credit transfer, or the like), a real-time gross settlement (RTGS) transfer, a wire transfer, a giro transfer, or the like directly from a financial account of a user. For example, in some embodiments, a payment module 104 may be provided by a core banking service provider, which may perform transactions between accounts held by member financial institutions internally, at a reduced or eliminated cost, without using a third-party payment network, or the like (e.g., because the core banking service provider is and/or has access to the card issuer, has access to the financial account, the financial institution 114, or the like). By authenticating an identity of a user on a hardware computing device 102 for the user and accessing aggregated financial accounts of the user (e.g., through an application programming interface (API), through a hypertext markup language (HTML) web interface, or the like for a third-party financial institution 114), in some embodiments, a payment module 104 may expedite payment to the third-party entity 108 in the transaction (e.g., by verifying funds in at or near real time, by transferring funds in at or near real time, or the like).

In one embodiment, a payment module 104 may determine a likelihood that a proposed transaction is fraudulent, based at least in part on aggregated transaction data for the user, on a location of a user's hardware computing device 102 and/or of a hardware payment device 112 for a merchant 108 or other third-party entity 108, on item level transaction data aggregated for the user, or the like. For example, a payment module 104 may compare one or more elements of a transaction to one or more previous transactions aggregated for the user (e.g., to determine a variance from the one or more previous transactions or the like), may compare a location of a mobile hardware computing device 102 to a location of a merchant 108 and/or of a hardware payment terminal 112 for the merchant 108.

In response to determining that a likelihood that a proposed transaction is fraudulent satisfies a fraud threshold, in some embodiments, a payment module 104 may deny the transaction, request a user select a different funding source, notify a user of the fraudulent transaction, request approval for the transaction from the user (e.g., using a separate communications channel such as a text message, a phone call, an email, a push notification on a hardware computing device 102, or the like), and/or take another remedial action. Using aggregated financial transaction data, item level data, location data from a mobile hardware computing device 102, or the like for fraud detection for subsequent transactions, in certain embodiments, may allow a payment module 104 to provide improved fraudulent transaction detection.

In certain embodiments, a payment module 104a on a user's hardware computing device 102 may communicate with a payment module 104c for a merchant 108 or other third-party entity 108 (e.g., either directly and/or through one or more backend payment modules 104b on one or more backend servers 110) over a data network 106, using near-field communications (NFC), a visually encoded representation (e.g., a quick response (QR) code matrix or other barcode, another type of image or animation, or the like), Bluetooth®, Wi-Fi, a radio frequency identifier (RFID), an infrared (IR) signal protocol, a radio frequency (RF) signal protocol, based on a determined geographic location for the user's hardware computing device 102 and/or for the third-party entity 108, or the like. In this manner, in some embodiments, a payment module 104 may complete a transaction between a user and a merchant 108 or other third-party entity 108 using a hardware computing device 102 of the user instead of a payment card and/or a payment card network, authenticating a user rather than a card, reducing fraud, reducing or eliminating interchange fees, expediting payment times, or the like.

In certain embodiments, a payment module 104a of a user's hardware computing device 102 may not communicate directly with a payment module 104c of a third-party entity 108 to the transaction, but both may communicate with a backend payment module 104b, with separate backend payment modules 104b in communication with each other, or the like (e.g., using a data network 106). A backend payment module 104b may compare determined geographic locations for a user's hardware computing device 102 and for a merchant 108 or other third-party entity 108 (e.g., for fraud detection, to trigger a transaction, to prompt a user and/or to present an offer to a user on the user's hardware computing device 102, to complete a transaction, or the like).

In some embodiments, as described in greater detail below, a payment module 104 may prompt a user with an offer and/or other message to the user on a hardware computing device 102 of the user (e.g., based on location data for the hardware computing device 102, in response to location data for the hardware computing device 102 indicating the user has approached within at least a predefined distance of a merchant 108 or other third-party entity 108, in response to the user breaking a geofence, or the like). For example, a payment module 104 may prompt a user to use a certain payment source (e.g., a payment module 104, a financial account, a mobile payment application, a mobile hardware computing device 102, a credit or debit card, or the like) for a payment to a merchant 108 or other third-party entity 108, may present an offer to the user to incentivize the user to use a certain payment source, or the like.

In some embodiments, in response to a user attempting to pay at a terminal device 112 using a different payment source (e.g., a card-based payment source, a source other than a mobile application of a payment module 104a, or the like) a payment module 104c may be configured to initiate the payment using the different payment source, and a backend payment module 104b (e.g., of a backend server 110, a financial institution 114, or the like) may initially reject the payment, triggering another payment module 104a, 104c to prompt the user and/or a cashier (e.g., through a hardware payment device 112 for a merchant 108 or the like) for the user to use a certain payment source (e.g., a payment module 104, a financial account, a mobile payment application, a mobile hardware computing device 102, a credit or debit card, or other financial account with the financial institution 114). In some embodiments, a payment module 104c may preemptively reject the payment at the payment location (e.g., on the hardware payment device 112 or the like). In a further embodiment, a backend payment module 104*b* on a backend server 110 and/or a financial institution 114 or the like may reject the payment. A payment module 104, in certain embodiments, may reject the payment using a third-party payment network associated with the different payment source (e.g., using a protocol of the third-party payment network or the like).

In one embodiment, a payment module 104*a* may prompt the user on a hardware computing device 102 of the user (e.g., a push notification, a text message, an email, or the like). In a further embodiment, a payment module 104*c* may prompt a cashier on a hardware payment device 112, prompt the user on a hardware payment device 112, or the like. For example, in one embodiment, in response to the attempted payment with the different payment source (e.g., a card-based payment source), a payment module 104 may determine whether a user associated with the different payment source has activated a mobile application and/or account associated with the payment module 104 (e.g., on a hardware computing device 102 of the user) and prompt the user through the mobile application, a push notification, or the like on the hardware computing device 102 in response to determining that the user has activated the mobile application, and/or the payment module 104 may prompt a cashier or the like associated with a merchant 108 to prompt a user verbally (e.g., in response to determining that the user has not activated a mobile application, or the like).

Using the certain payment source (e.g., a checking or savings account for a user linked to the payment module 104, an account balance held for the user by the payment module 104, a digital currency source such as a cryptocurrency and/or blockchain payment source, or the like), for example, may avoid processing and/or interchange fees for a third-party payment network, a card-based payment network, or the like. In response to the user refusing to use the certain payment source, in some embodiments, a payment module 104*c* may resubmit the payment with the different payment source (e.g., a card-based payment) and the backend payment module 104*b* may approve and process the resubmitted payment using the different payment source. By initially rejecting a payment with a different payment source, in some embodiments, a payment module 104 may trigger a prompt to a user without incurring fees from a third-party payment network, in a manner compatible with existing hardware payment terminals 112 (e.g., using an existing rejection mechanism), or the like. If the user determines to use the prompted payment source instead (e.g., an internal payment source associated with a payment module 104, with an associated financial institution 114, or the like), in certain embodiments, the transaction may have lower overhead fees (e.g., processing fees, interchange fees, or the like) than a transaction using the different payment source.

In one embodiment, as described in greater detail below, a payment module 104*a* may be part of, integrated with, and/or in communication with a personal financial management (PFM) mobile application executing on a hardware computing device 102 for the user, and may already have access to and authorization from the user to access one or more of the user's financial accounts (e.g., accounts with a plurality of third-party financial institutions 114, 114 or the like) using the user's electronic credentials. A payment module 104 may use the user's electronic credentials to aggregate transaction data for the user, to verify an availability of funds and/or credit, to send payment for a transaction, or the like. A payment module 104, in some embodiments, may cleanse, categorize, classify, and/or otherwise process the user's aggregated financial transaction data from one or more third-party financial accounts and/or financial institutions 114 (e.g., to facilitate accurate fraud detection for subsequent financial transactions, to provide one or more budgeting/financial management tools to the user, or the like).

In some embodiments, since the user and/or one or more of the user's payment sources are already authenticated by a payment module 104 on a hardware computing device 102 for the user, the payment module 104 may offer expedited and/or simplified preorders and/or prepayments (e.g., payment and/or availability of funds/credit may be verified and/or authenticated at time of preorder and/or prepayment, so that a user can simply pick up the order without presenting a card or providing further authentication, or the like).

In one embodiment, a payment module 104*c* for a third-party entity, in response to a completed transaction or the like, may provide item level data (e.g., identifiers of a plurality of items purchased in the transaction, costs for the items, or the like) for the transaction to a payment module 104*a* for the user, to a backend payment module 104*b*, or the like. In other embodiments, a payment module 104*c* may provide item level data prior to completion of a transaction, and a payment module 104 may use the item level data for fraud detection for the transaction. Item level data is described in greater detail below. For example, in some embodiments, a payment module 104*c* may provide the item level data as an electronic receipt to the user on a hardware computing device 102 for the user, or the like.

In one embodiment, a payment module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third-party entities 108, financial institutions 114, or the like. The payment module 104, in certain embodiments, accesses a server 108 of a third-party entity 108 and/or of a financial institution 114 using a user's electronic credentials to download data associated with the user from the server 108, such as a user's financial transaction records or other financial data, a user's photos, a user's social media posts, a user's medical records, and/or other data associated with and/or owned by a user but stored by a server 108 of a third-party entity 108 such as a financial institution 114 or the like (e.g., stored by hardware not owned, maintained, and/or controlled by the user). The payment module 104, in various embodiments, may provide the downloaded data to the user locally (e.g., displaying the data on an electronic display of a hardware computing device 102); may provide the downloaded data from the hardware computing device 102 of the user to and/or package the data for a remote server 110 (e.g., a backend payment module 104*b*) or other remote device (e.g., another hardware computing device 102 of the user, a hardware computing device 102 of a different user, or the like) which may be unaffiliated with the third-party entity 108; may provide one or more prompts, alerts, messages, advertisements, or other communications to the user (e.g., on a hardware computing device 102) based on the downloaded data; or the like.

In certain embodiments, the system 100 includes a plurality of payment modules 104 disposed/located on hardware computing devices 102 of a plurality of different users (e.g., comprising hardware of and/or executable code running on one or more hardware computing devices 102). The plurality of payment modules 104 may act as a distributed and/or decentralized payment system 100, enabling users to make payments to other users, to merchants 108, and/or to other third-party entities 108.

In one embodiment, a hardware computing device 102 may include and/or execute an internet browser, which a user may use to access a server 108 of a merchant 108, a financial institution 114, and/or another third-party entity 108 (e.g., by loading a webpage of the third-party entity 108 in the internet browser). At least a portion of a payment module 104, in certain embodiments, may comprise a plugin to and/or an extension of an internet browser of a user's personal hardware computing device 102, so that a third-party entity 108 may not block the payment module 104 from accessing the server 108 of the third-party entity 108 without also blocking the user's own access to the server 108 using the internet browser.

For example, the payment module 104 may use the same cookies, IP address, saved credentials, or the like as a user would when accessing a server 108 of a third-party entity 108 through the internet browser. In certain embodiments, the payment module 104 may support integration with multiple different types of internet browsers (e.g., on different hardware computing devices 102). In this manner, in certain embodiments, a payment module 104 may access a server 108 of a third-party entity 108 such as a merchant 108 and/or a financial institution 114 in order to validate an availability of funds/credit for a transaction, to download item level data for a transaction, to download financial transaction data or other financial data, for a user (e.g., using an HTML web interface or the like).

A payment module 104, in certain embodiments, may mimic or copy a user's behavioral pattern in accessing a server 108 of a third-party entity 108 (e.g., a merchant 108 and/or a financial institution 114), to reduce a likelihood that the third-party entity 108 may distinguish access to the server 108 by a payment module 104 from access to the server 108 by a user. For example, a payment module 104 may visit one or more locations (e.g., webpages using an HTML web interface) of a server 108 of a third-party entity 108, even if the payment module 104 does not intend to download data from each of the one or more locations, may wait for a certain delay time between accessing different locations, may use a certain scroll pattern, or the like, to mask the payment module 104's downloading and/or aggregating of a user's data, to reduce the chances of being detected and/or blocked by the third-party entity 108. In other embodiments, a payment module 104 may validate an availability of funds/credit for a transaction, may download item level data for a transaction, may download financial transaction data or other financial data, or the like for a user using an API or other electronic interface for a third-party entity 108 such as a merchant 108 and/or a financial institution 114 (e.g., instead of or in addition to using an HTML web interface).

In one embodiment, at least a portion of a payment module 104 may be integrated with or otherwise part of another application executing on a hardware computing device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like). Payment modules 104a, 1104c may pass messages to each other and/or to a backend payment module 104b, to exchange payment information, item level data or other electronic payment receipts, validate an availability of funds, electronically transfer funds, or the like.

In various embodiments, a payment module 104 may be embodied as hardware, software (e.g., computer executable program code stored on a non-transitory computer readable storage medium), or some combination of hardware and software. In one embodiment, a payment module 104 may comprise executable program code stored on a non-transitory computer readable storage medium (e.g., one or more memories) for execution on a processor of a hardware computing device 102, a hardware payment device 112, 108, a backend server 110, or the like (e.g., one or more processors). For example, a payment module 104 may be embodied as executable program code executing on one or more of a hardware computing device 102, a hardware payment device 112, 108, a backend server 110, a combination of one or more of the foregoing, or the like. In such an embodiment, the various modules that perform the operations of a payment module 104, as described below, may be located on a hardware computing device 102, a hardware payment device 112, 108, a backend server 110, a combination of the two, or the like.

In various embodiments, a payment module 104 may be embodied as a hardware appliance that can be installed or deployed on a user's hardware computing device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), at a point of sale for a merchant 108 (e.g., as a hardware payment terminal 112, installed on a hardware payment terminal 112, or the like), on a backend server 110, or elsewhere on a data network 106 or the like. In certain embodiments, a payment module 104 may comprise a hardware computing device such as a secure hardware dongle or other hardware appliance device that attaches to another hardware computing device 102, 108, 110, 112, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a payment module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a payment module 104.

A payment module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a payment module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a payment module 104.

The semiconductor integrated circuit device or other hardware appliance of a payment module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a payment module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

A wireless data network 106 may include a cellular telephone network. A wireless data network 106 may also employ a Wi-Fi network based on any one of the Institute of Electrical and Electronics Engineers ("IEEE") 802.11 standards. A wireless data network 106 may include a Bluetooth® connection. In addition, a wireless data network 106 may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, EPCGlobal™, or the like. A wireless data network 106 may be an infrared connection including connections conforming at least to the Infrared Physical Layer Specification ("IrPHY") as defined by the Infrared Data Association® ("IrDA"®).

The one or more merchants 108, financial institutions 114, and/or other third-party entities 108, in one embodiment, may include one or more network accessible computing systems such as one or more web servers hosting one or more web sites, an enterprise intranet system, an application server, an API server, an authentication server, or the like. The one or more third-party entities 108, 114 may include systems related to various institutions or organizations. For example, a third-party entity 108 may include a system providing electronic access to a merchant 108, a financial institution 114, a university, a government agency, a utility company, an email provider, a social media site, a photo sharing site, a video sharing site, a data storage site, a medical provider, and/or another entity that makes or receives payments and/or that stores data associated with a user. A third-party entity 108, 114 may allow users to create user accounts to make payments; open financial accounts; upload, view, create, and/or modify data associated with the user; or the like. Accordingly, a third-party entity 108 may include an authorization system, such as a login element or page of a web site, application, or similar front-end, where a user may provide credentials, such as a username/password combination, to make a payment, access the user's data, or the like.

In one embodiment, the one or more backend servers 110 and/or one or more backend payment modules 104*b* provide central management of the networked payment modules 104*a*, 104*c*. For example, the one or more backend payment modules 104*b* and/or a backend server 110 may manage validation of availability of funds/credit for an account of a user with a financial institution 114, may manage electronic transfer of funds between accounts for users and merchants 108, may store and/or provide access to downloaded user data (e.g., item level data and/or other electronic receipts for transactions), or the like. A backend server 110 may include one or more servers located remotely from the hardware computing devices 102 and/or the one or more third-party entities 108. A backend server 110 may include at least a portion of the modules or sub-modules described below with regard to the payment modules 104 of FIG. 2 and/or of FIG. 3, may comprise hardware of a payment module 104, may store executable program code of a payment module 104 in one or more non-transitory computer readable storage media, and/or may otherwise perform one or more of the various operations of a payment module 104 described herein in order to facilitate payments.

Figure 2:
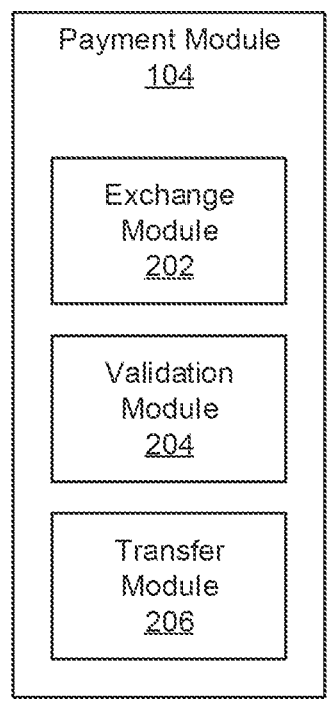
FIG. 2 is a schematic block diagram of one embodiment of a payment module.

FIG. 2 depicts one embodiment of a payment module 104. In the depicted embodiment, the payment module 104 includes an exchange module 202, a validation module 204, and a transfer module 206. The payment module 104, in certain embodiments, may be substantially similar to the payment module 104 described above with regard to FIG. 1.

In one embodiment, the exchange module 202 is configured to exchange payment information between a hardware computing device 102 for a user (e.g., a mobile hardware computing device 102, a desktop hardware computing device 102, or the like) and a hardware payment device 112 for a merchant 108 (e.g., a hardware payment terminal 112, a hardware payment server computing device 112, or the like). The exchange module 202 may exchange the payment information wirelessly, over a data network 106, or the like.

In one embodiment, the exchange module 202 may exchange payment information using a visually encoded representation of data encoded in a quick response (QR) code matrix or other barcode, an image, an animation, or the like displayed on either the hardware computing device 102 or the hardware payment device 112 and scanned by the other. For example, in some embodiments, an exchange module 202 executing on a mobile hardware computing device 102 of a user may display a QR code or another visually encoded representation on a screen of the mobile hardware computing device 102, which the user may present to a camera or other optical sensor of a hardware payment terminal 112 to provide payment information from the mobile hardware computing device 102 to an exchange module 202 executing on the hardware payment terminal 112. In a further embodiment, an exchange module 202 executing on a hardware payment device 112 may display a QR code or another visually encoded representation on an electronic display screen of the hardware payment device 112, on an electronic display screen of a hardware computing device 102 of a user (e.g., displaying the QR code or other visually encoded representation on one hardware computing device 102 of a user allowing the user to scan the QR code or other visually encoded representation using a different hardware computing device 102 of the user, or the like) and an exchange module 202 executing on a hardware computing device 102 of the user may scan the displayed QR code or other visually encoded representation to decode or otherwise determine payment information from the hardware payment device 112. In various embodiments, payment information may be encoded directly within a QR code or other visually encoded representation, linked to by a URL or other address or pointer encoded within a QR code or other visually encoded representation, or the like.

In one embodiment, the exchange module 202 may use a near-field communication (NFC) protocol between a hardware computing device 102 for a user and a hardware payment device 112 (e.g., a hardware payment terminal 112 or the like) for a merchant 108 to exchange payment information between them. For example, a user my place a mobile hardware computing device 102 within a predefined range of or proximity to a hardware payment terminal 112, in order to exchange payment information between them (e.g., emulating an NFC card presented to an NFC reader, as an NFC peer to peer communication, or the like).

In one embodiment, the exchange module 202 may exchange payment information using a one-time-use code (e.g., a numeric code, an alphanumeric code, or the like). In some embodiments, a one-time-use code may be provided by an exchange module 202 executing on a hardware payment device 112 (e.g., displayed on an electronic display screen, sent in a text message or email, sent as a push notification, or the like) and subsequently entered by a user into a hardware computing device 102 for the user. In a further embodiment, a one-time-use code may be provided by an exchange module 202 executing on a hardware computing device 102 for the user, and the user, a cashier, or the like may enter the one-time-use code on a hardware payment device 112. A one-time-use code, in one embodiment, may be generated by an exchange module 202 executing on a backend server 110 or the like, and provided to a hardware computing device 102 for a user and/or to a hardware payment device 112 of a merchant 108 over a data network 106. A one-time-use code may comprise a key, indexed to payment information, such that providing the one-time-use code allows the receiving party to access the payment information, or the like.

The exchange module 202, in some embodiments, may exchange payment information between a hardware computing device 102 for a user and a hardware payment device 112 for a merchant 108 over a data network 106. An exchange of payment information over a data network 106, in one embodiment, may be at least partially over a wireless communications network (e.g., to or from a mobile hardware computing device 102 over a cellular telephone network, a Wi-Fi or other 802.11 based network, a Bluetooth® connection, an RFID communication, an infrared connection, or the like), to a wireless or wired hardware payment device 112.

Payment information, in certain embodiments, includes one or more of an amount for a transaction, an identifier for a party to a transaction (e.g., a user, a merchant 108, or the like), an identifier for an account for a party to a transaction (e.g., a source account, a destination account, an account for a user, an account for a merchant 108, or the like), and/or other information describing or otherwise associated with a transaction. An account for a user and/or merchant 108 may comprise an account with the merchant 108 or other third-party entity 108, an account with the payment module 104 and/or an entity associated therewith, a financial account (e.g., a payment source, a checking account, a savings account, a credit account, a card-based account, or the like), may include both an account number and a routing number, or the like. An indicator for a party to a transaction, an account for a party to a transaction, or the like may comprise the actual value indicated (e.g., a name of a party, a username for a party, an account number, for a party, or the like) or may comprise a pointer, key, link, or other indicator providing access to the actual value indicated.

In some embodiments, the exchange module 202 provides payment information for a transaction from a hardware payment device 112 for a merchant 108 to a hardware computing device 102 for a user (e.g., an identifier for the merchant 108, an account for the merchant 108, an amount for the transaction, or the like), enabling a payment module 104a, 104b for the user to complete the transaction. In other embodiments, the exchange module 202 provides payment information for a transaction from a hardware computing device 102 for a user to a hardware payment device 112 for a merchant 108 (e.g., an identifier for the user, an account for the user, or the like), enabling a payment module 104c, 104b for the merchant 108 to complete the transaction. In a further embodiment, the exchange module 202 may send payment information both from a hardware payment device 112 to a hardware computing device 102 and from the hardware computing device 102 to the hardware payment device 112 (e.g., so that both parties have a record of a transaction, to combine and/or complete the payment information with partial information from each party, or the like).

The exchange module 202, in one embodiment, may exchange payment information without any indicator of a payment card (e.g., an actual or virtual credit card, debit card, or the like), for a non-card-based payment. For example, the exchange module 202 may exchange payment information and a payment module 104 may complete a transaction without a credit or debit card number, card expiration date, card billing address, card security code (e.g., card verification value (CVV)), reading a chip or magnetic strip of a credit or debit card, or the like. Instead, in various embodiments, the exchange module 202 may exchange payment information for a checking or savings account (e.g., account number, routing number, last name or business name, or the like), an account balance held for the user by the payment module 104, a digital currency source such as a cryptocurrency and/or blockchain payment source, or the like. In some embodiments, a payment module 104 may support card-based payments as well as non-card-based payments but may encourage and/or prefer non-card-based payments (e.g., in order to reduce or eliminate interchange fees, expedite payments by reducing or eliminating float periods, or the like).

In one embodiment, the exchange module 202 may exchange payment information including item level data for a transaction. Item level data is described in greater detail below, but may include identifiers of one or more items purchased in the transaction, costs for the one or more items, or the like. Item level data may provide fine grained details of a transaction, allowing for better records for a transaction, more accurate financial budgeting and/or accounting, or the like.

In one embodiment, the validation module 204 is configured to validate an availability of funds for a transaction using an electronic interface (e.g., an API, an HTML web interface, or the like) for an account for a user at a third-party institution 114, or the like (e.g., a financial institution 114 or other third-party entity 108). For example, the validation module 204 may use electronic credentials of a user (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) to access an account balance, an available funds balance, or the like for the user over a data network 106 using an API for a financial institution 114 or other third-party entity 108 (e.g., a secure delegated access API such as OAuth, a financial data API such as a financial data exchange (FDX) or an open financial exchange (OFX) API, and/or another type of API), using an HTML web interface (e.g., accessing a webpage of a website or other online location on behalf of the user, screen scraping, or the like), and/or using another direct electronic interface.

In certain embodiments, the validation module 204 may pre-validate an availability of funds for a transaction prior to the transaction (e.g., in order to expedite the transaction when it does occur). For example, the validation module 204 may periodically check or otherwise monitor a user's account balances, financial transactions, or the like (e.g., in response to the user accessing the payment module 104, hourly, daily, weekly, monthly, quarterly, or the like). In one embodiment, the validation module 204 may cooperate with a location module 322 or the like and may pre-validate an availability of funds for a transaction in response to determining that a mobile hardware computing device 102 of a user has approached within a predefined distance (e.g., a geofence or the like) of a hardware payment device 112, of a physical and/or geographic location associated with a merchant 108, or the like (e.g., based on data from a global positioning system (GPS) or other location sensor of the mobile hardware computing device 102, or the like).

In this manner, (e.g., using an API, an HTML, web interface, or other direct electronic interface), in certain embodiments, the validation module 204 may directly validate the availability of funds for a transaction with the entity 108, 114 holding an account for the user, rather than requiring an acquiring financial institution contact an issuing financial institution using a legacy card-based payment network, with the resulting interchange fees and long float times before receiving payment.

In certain embodiments, the validation module 204 may use one or more additional factors to determine a likelihood that a user will be able to pay for a transaction using an account for the user, based on aggregated financial transactions for the user from the account, from one or more other financial accounts for the user, or the like. The validation module 204 may use the one or more additional factors in order to validate transactions when a network connection (e.g., to the data network 106 or the like) is offline, to allow merchants 108 to customize and/or select their own desired levels of risk, or the like.

For example, the validation module 204 may provide a merchant 108 the option to use an estimate of a likelihood that a user will be able to pay for a transaction while a network connection is offline, using aggregate financial transactions downloaded for offline use on the hardware computing device 102 of the user, allowing the transaction to be approved and completed, with the actual transfer of funds for the transaction being queued for a period of time until the network connection is back online, or the like.

The validation module 204, in certain embodiments, may estimate a likelihood that a user will be able to pay for a transaction based on an account balance prior to a network connection going offline, based on a transaction history for the account and/or for one or more other financial accounts of the user, based on other transactions projected to debit or deposit funds from the account (e.g., based on detected recurring payments in the transaction history, recurring deposits, other payments made by the payment module 104, or the like), and/or on one or more other factors. In some embodiments, the validation module 204 may use a machine learning based artificial intelligence analysis of a user's transaction history in order to estimate the user's ability to pay for a transaction using an account.

The validation module 204, in one embodiment, may provide a merchant 108 (e.g., through a hardware payment device 112, an email, a text message, a push notification, or the like) with a risk score for a transaction, based on the estimated likelihood that a user will be able to pay for the transaction. For example, a risk score may comprise a risk scale (e.g., low, medium, and high; red, yellow, and green; a numeric scale; a percentage scale; or the like). In one embodiment, a merchant 108 may dynamically determine whether or not to accept the risk of a transaction for each individual transaction. In a further embodiment, a merchant 108 may select a risk threshold (e.g., on a risk scale or the like), and the validation module 204 may determine whether or not to validate or decline a transaction based on the risk threshold selected by the merchant 108. The validation module 204 may allow a merchant 108 to modify their selected risk threshold over time. In some embodiments, the validation module 204 may allow a merchant 108 to select multiple risk thresholds, such as a first risk threshold for a risk metric and a second risk threshold for an amount of time that has passed since an account balance was available for the account, or the like.

A validation module 204, in some embodiments, may configured to determine a risk metric, a credit decision, a credit worthiness, or the like based on aggregated transaction data. A validation module 204, in various embodiments, may use machine learning and/or other artificial intelligence, a predefined risk formula, or the like to determine a risk metric, a credit worthiness of a user, make a credit worthiness decision, or the like based on the aggregated transaction data.

A validation module 204 may use a clustering algorithm (e.g., machine learning and/or other artificial intelligence) to group users based on the transaction data for the users, and assign risk scores, credit scores, and/or determine credit worthiness based on the clustered groups, or the like. A validation module 204 may determine and/or analyze trends in a user's transaction data (e.g., a trajectory or other trend of a user's spending, saving, and/or other financial decisions over time) and base a risk score, a credit decision, and/or credit worthiness based on the trends.

For example, a validation module 204 may group restaurants, clothing stores, merchants, and/or other spending categories by quality, cost, service level, or the like, and determine if a user's spending has changed or trended from one tier of merchant and/or spending category to another (e.g., from fast food to sit down restaurants or vice versa, from bargain clothing provider to designer of vice versa, from little or no 401(k)/IRA/HSA/FSA or other investment contributions to regular contributions or vice versa, and/or other changes or trends), and may determine and/or adjust a user's risk score, credit worthiness, or the like based on the trends. Instead of or in addition to analyzing clustering and/or trends, a validation module 204 may determine whether a user's spending and/or debt increases or decreases in connection with the clustering and/or trends (e.g., if a user's debt increases and the user's spending has transitioned from a lower cost tier to a higher cost tier, a validation module 204 may increase the user's risk score, lower the user's credit worthiness, or the like; if a user's saving increases and/or is maintained and the user's spending has transitioned from a lower cost tier to a higher cost tier, a validation module 204 may loser the user's risk score, increase the user's credit worthiness, or the like).

A validation module 204 may process and/or analyze past trends, current trends, and/or estimated future trends of a user (e.g., using machine learning and/or other artificial intelligence) to determine a risk score, credit worthiness, make a credit decision, or the like for the user. A validation module 204 may cluster and/or otherwise group users based on trends and/or changes in trends for users over time and may adjust and/or alter a risk score, credit worthiness, or the like of a user in response to a change in trends for the user over time (e.g., a change in a cluster and/or group of the user over time). A validation module 204 may provide a risk score, credit decision, credit score, credit report, credit worthiness analysis, or the like to a merchant 108 or other entity requesting a risk score and/or credit for the user. In this manner, a risk score, a credit worthiness, or the like for a user may be determined without a credit score from a credit bureau.

In one embodiment, the validation module 204 is configured to analyze aggregated transaction data using machine learning to determine a risk metric, or the like. As used herein, machine learning refers to a field of artificial intelligence that uses statistical techniques to give computer systems the ability to "learn" (e.g., progressively improve performance on a specific task) from data, without being explicitly programmed. The validation module 204 may use various machine learning functions, methods, processes, algorithms, or the like for predicting, forecasting, projecting, estimating, or the like a credit metric for the user based on the aggregated transaction data.

The machine learning functions may include both supervised learning (example inputs and their desired outputs are provided with the goal to learn a general rule that maps inputs to outputs) and unsupervised learning (no labels are given to the learning algorithm, leaving it on its own to find structure in its input) algorithms. Examples of different machine learning algorithms may include decision tree learning, association rule learning, deep learning, inductive logic programming, support vector machines, clustering, Bayesian networks, representation learning, genetic algorithms, rule-based learning, deep learning, and/or the like. The machine learning functions may be part of an artificial neural network where one or more machine learning algorithms may work together to process the aggregated transaction data. Furthermore, the validation module 204 may create machine learning ensembles, e.g., a set of multiple different machine learning algorithms that process the transaction data to determine a more accurate prediction for the user's credit metric than a single machine learning algorithm.

Thus, in one embodiment, the validation module 204 may provide the user's aggregated transaction data to one or more machine learning algorithms for training and/or inference to generate one or more predictions for the risk metric for the user. The risk metric may be a value, score, grade, or the like that describes how likely the user is to repay a debt. For example, the validation module 204 may provide a history of the user's transaction data to the machine learning for training, e.g., the last year, the last five years, or the like. Once the machine learning is trained, the validation module 204 may provide more recent transaction data, transaction data in real-time, or the like to the machine learning to generate risk metric predictions, update existing risk metric predictions, or the like for the user. In this manner, the validation module 204 can generate up-to-date and accurate machine learning predictions of a user's estimated ability to pay for a transaction from an account in real-time.

In one embodiment, the validation module 204 directs the machine learning to implement, execute, or the like a clustering algorithm for grouping a plurality of users based on the aggregated transaction data for each of the plurality of users. For instance, the machine learning may cluster users who have similar transaction histories, similar account characteristics, similar income levels, similar loans or other debts, and/or the like as determined according to the aggregated transaction data for each of the users. In certain embodiments, the validation module 204 may generate or predict a risk metric for a clustered group using the machine learning such that each user in the group is associated with the predicted risk metric. In this manner, the validation module 204 may provide additional data to the machine learning (e.g., not data for just a single user, but for a plurality of similar users) so that more accurate risk metric predictions may be generated.

In one embodiment, the validation module 204 is configured to determine one or more trends in the user's aggregated transaction data that describes one or more tendencies of the user over time. For instance, the validation module 204 may determine a trajectory, a forecast, or the like of the user's income, spending, saving, debt paydown, debt increases, and/or other financial decisions over time. In one embodiment, the validation module 204 may use the machine learning to determine, at least in part, the user's risk metric based on the user's trends. For example, the validation module 204 may assign weights, values, scores, factors, or the like to different trends (e.g., if the user's income is trending upward year over year, then the validation module 204 may place more weight on the user's income to increase the user's credit score whereas if the user's rate of saving has decreased monthly, the validation module 204 may place more weight on the user's saving decrease to indicate that the user may not have enough money for a transaction) and may provide the weights to the machine learning as additional factors to process when determining the user's risk metric.

In one embodiment, the validation module 204 is further configured to group one or more merchants 108 of the user's aggregated transaction data based on various characteristics of the merchants 108. For instance, the validation module 204 may group restaurants, hotels, clothing stores, online retailers, or the like based on characteristics such as quality, cost, service level, or the like (e.g., luxury merchants v. standard merchants, fast food v. fine dining, one-star hotels v. five-star hotels, or the like). The validation module 204 may determine the characteristics based on searching the Internet, scraping web pages, or the like of online review sites, social media data, the merchant's website (e.g., to determine prices of services, clothing, food, etc.), and/or the like.

In one embodiment, based on the characteristics of the merchants 108 of the transactions in the user's aggregate transaction data, the validation module 204 may determine whether the user's spending has changed or trended from one tier of merchant or spending category (e.g., fast food) to a different tier of merchant or spending category (e.g., fine dining). The machine learning may process the trend data as another factor to consider when determining the user's risk metric. For example, if the user's spending is trending from bargain clothing merchants to more expensive clothing merchants, this may indicate that the user is making more money and, therefore, the user may be more likely to repay a loan or other debt.

In further embodiments, the validation module 204 is further configured to determine whether the user's debt and/or the user's savings has increased and/or decreased in relation to the user's spending at the one or more groups of merchants 108. For example, the validation module 204 may indicate, set a weight, provide a factor or value, or the like to the machine learning that indicates a greater risk in response to determining that the user's debt has increased while the user's spending changed from a lower tier merchant to a higher tier merchant. In another example, if the user's savings increases while the user's spending transitioned from a lower tier merchant to a higher tier merchant, the validation module 204 may provide a weight, value, factor, or the like to the machine learning that indicates a decrease in the user's risk.

In one embodiment, the validation module 204 may identify and group users based on similar trend data. For example, the validation module 204 may employ machine learning to use a clustering algorithm to cluster users based on various trend indicators over time, e.g., users who have increased savings by X percent, users who have increased debts by X %, users who have changed merchant tiers from higher to lower or lower to higher, and/or the like. In such an embodiment, the validation module 204 may dynamically determine or adjust a risk metric of the users in the user groups, using the machine learning, based on the different trends over time. For instance, users may move out of certain trend groups and into other trend groups over time as the user's financial situation changes.

For instance, the validation module 204 and/or the validation module 204 may determine, using machine learning, that a user who has multiple mortgages, car loans, credit card debt, or the like is still credit worthy because the user is making regular contributions to their investment accounts, is changing spending habits by switching from more expensive merchants (e.g., a higher tier merchant) to lower tier merchants, and has similar spending, income, and debt characteristics as similar users with lower risk metrics (e.g., as determined from the other users aggregated transaction data or the like).

In one embodiment, the transfer module 206, in response to the validation module 204 validating an availability of funds, is configured to transfer the funds for a transaction. In some embodiments, (e.g., for non-card-based transactions of the like) the transfer module 206 may be configured to electronically transfer the funds directly from the account for the user to an account for the merchant to complete the transaction. For example, the transfer module 206 may use an electronic funds transfer (ETF), an ACH electronic payment (e.g., an ACH direct debit collection, an ACH credit transfer, or the like), a real-time gross settlement (RTGS) transfer, a wire transfer, a giro transfer, or the like (e.g., rather than making a card-based payment). In a further embodiment, the transfer module 206 may transfer funds using a core banking system, an API for a financial institution 114, internally between internally held accounts for a financial institution 114, or the like.

Figure 3:
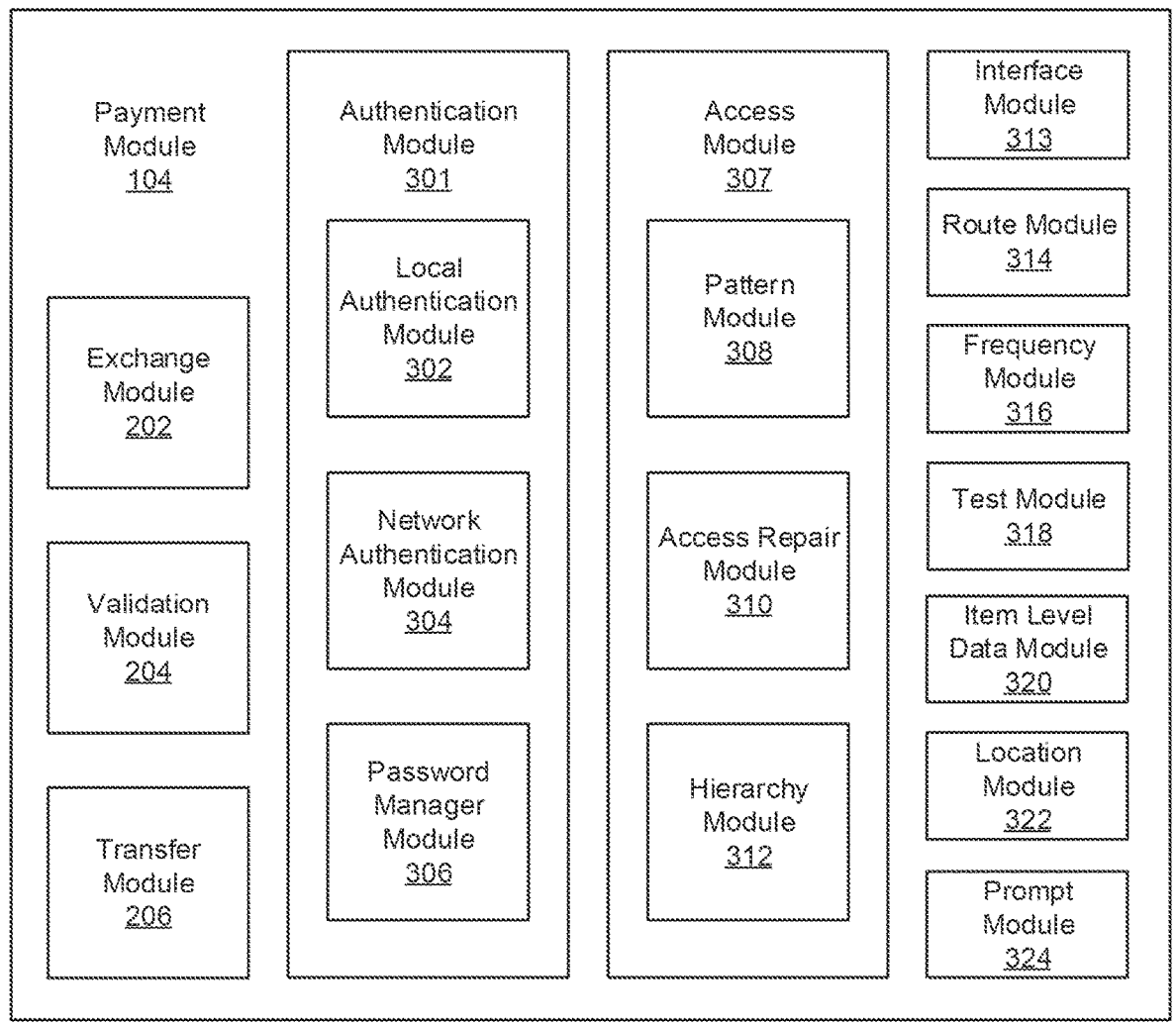
FIG. 3 is a schematic block diagram of a further embodiment of a payment module.

FIG. 3 depicts a further embodiment of a payment module 104. In the depicted embodiment, the payment module 104 includes an exchange module 202, a validation module 204, and a transfer module 206 and further includes an authentication module 301, an access module 307, an interface module 313, a route module 314, a frequency module 316, a test module 318, an item level data module 320, a location module 322, and a prompt module 324. The authentication module 301, in the depicted embodiment, includes a local authentication module 302, a network authentication module 304, and a password manager module 306. The access module 307, in the depicted embodiment, includes a pattern module 308, an access repair module 310, and a hierarchy module 312. The exchange module 202, the validation module 204, and/or the transfer module 206, in some embodiments, may be substantially similar to the exchange module 202, the validation module 204, and/or the transfer module 206 described above with regard to FIG. 2.

In one embodiment, the authentication module 301 authenticates a user on a hardware computing device 102 for the user prior to a transaction for the user with a merchant 108 or other third-party entity 108. For example, the authentication module 301 may verify a user's electronic credentials for an executable application and/or an online account associated with the payment module 104, a backend server 110, or the like.

The authentication module 301, in some embodiments, may be configured to verify an identity of an associated user (e.g., to a backend server 110, to a merchant 108 or other merchant 108 or other third-party entity 108, to a third-party financial institution 114, or the like) based on data from a sensor of a hardware computing device 102 for the user, based on downloaded and/or aggregated data from a payment module 104, based on the user's usage history of a hardware computing device 102, based on information queried from the user, and/or based on other information available to a hardware computing device 102 in association with a transaction.

In one embodiment, an authentication module 301 may comprise a trusted repository of a user's identity information, which the user may authorize to provide certain identity information to one or more merchants 108 or other third-party entities 108. For example, in certain embodiments, an authentication module 301 may provide an interface for a user to provide certain identity information (e.g., name, address, telephone number, email address, social security number, drivers' license number, birthdate, gender, financial information, employment history, income data, personal reference contact information, residential address history, security question answers, mother's maiden name, city of birth, schools attended and/or years attended, spouse's name, dependent's names, or the like), which the authentication module 301 may provide to a merchant 108 or other third-party entity 108, 114 (e.g., in order to complete a transaction or the like for the user) in response to authorization from the user. In this manner, in one embodiment, an authentication module 301 may simplify identify verification for a transaction for a user with one or more merchants 108 or other third-party entities 108, 114, providing a merchant 108 or other third-party entity 108, 114 with identify verification nearly instantly (e.g., over the data network 106; using a wireless communications protocol such as Bluetooth®, near field communication (NFC), or the like; and/or using another electrical and/or digital communications channel).

An authentication module 301 may require verification and/or authentication from a user (e.g., electronic credentials such as username and password, fingerprint scan, retinal scan, digital certificate, PIN, challenge response, security token, hardware token, software token, DNA sequence, signature, facial recognition, voice pattern recognition, bioelectric signals, two-factor authentication credentials, or the like) prior to a transaction with a merchant 108 or other third-party entity 108 (e.g., using hardware and/or a sensor of the user's hardware computing device 102, or the like). An authentication module 301, in certain embodiments, may monitor, store, and/or track certain sensor information (e.g., location data from a GPS sensor, a history of valid and/or invalid authentication or other identity verification events of a user, a transaction history, application install or usage history, mobile wallet or other electronic payment information, health information such as steps and/or heartrate data, and/or other information), with the user's permission, in order to verify and/or authenticate the user at a later time, or the like.

In one embodiment, an authentication module 301 may use sensor information, a transaction history, data aggregated by a payment module 104, or the like to dispute one or more transactions, verify and/or authenticate a transaction or other event, or the like for a user. For example, in certain embodiments, an authentication module 301 may automatically and/or dynamically cross-reference a location of a transaction with a location indicated by sensor information to authenticate, validate, and/or verify that the transaction is being made by the user. The transaction may be selected for verification by an authentication module 301, a user, selected for verification by a merchant 108 or other third-party entity 108, or the like. In one embodiment, for example, an authentication module 301 may determine that a user authenticated (e.g., using electronic credentials, a fingerprint, facial recognition, or the like) in one geographic location, at least a certain distance away from a geographic location at which a transaction occurred, and therefore determine that the transaction was fraudulent, or the like.

An authentication module 301, based on sensor information, input from a user, or the like, may determine one or more known locations for a user, such as a home location, a work location, or the like, and may refuse a transaction, dispute a transaction, request verification from a user, and/or mark a transaction as fraudulent and/or invalid in response to determining that a transaction occurred (e.g., an aggregated and/or downloaded transaction) or is occurring (e.g., in real time, during runtime) at a location at least a selected threshold distance away from a known location, or the like.

To verify a transaction, if a transaction is suspected to be fraudulent, if a hardware computing device 102 is stolen, and/or in response to another authentication event, an authentication module 301 may query a user based on previous sensor data (e.g., asking the user a question only the user would know, based on previous sensor data or the like). For example, an authentication module 301 may prompt a user "where were you an hour ago?", where a previous valid location was (e.g., a location where a previous verified transaction occurred), a party to a previously verified transaction, an item and/or service purchased in a previously verified transaction, "what time did you get home last night?", "which of these applications is installed on this device", "which of these applications have you deleted from this device?", or the like to authenticate an identity of the user based on information known to the user and the authentication module 301.

In certain embodiments, an authentication module 301 may determine if an application and/or service executing on a hardware computing device 102 is available, has been recently accessed, or the like, which may allow a thief or other fraudulent user to determine an answer to a verification question, and may select a different question for which an answer isn't available, for which an answer hasn't been accessed, or the like. In one embodiment, a merchant 108 or other third-party entity 108 may request a location from an internet browser being used for a transaction and an authentication module 301 may compare the location for the merchant 108 or other third-party entity 108 with a location from a sensor of a hardware computing device 102 associated with the user, and may validate and/or authenticate the transaction in response to the locations matching (e.g., being within a certain distance of each other, or the like).

In certain embodiments, in cooperation with a password manager module 306 or the like, an authentication module 301 may manage one or more of a user's passwords, and use authentication questions, sensor data, or the like to verify and/or authenticate a user. In this manner, in one embodiment, an authentication module 301 may allow a user to forget passwords, instead authenticating the user based on sensor data, known questions and answers, or the like.

In one embodiment, in response to a user request and/or permission, an authentication module 301 may provide information to a merchant 108 or other third-party entity 108 (e.g., health data such as steps, heart rate, time sitting and/or standing, distance walked and/or ran, other fitness activities, sleep information, caloric intake, and/or other health or fitness data; driving information such as maximum speed, minimum speed, average speed, breaking distance, turning gravitational force, and/or other automobile driving information; financial information from electronic, mobile, and/or wireless payments, from transaction data or other financial information downloaded and/or aggregated by a payment module 104, and/or other transaction and/or financial information; and/or other data accessible to the authentication module 301), in order to receive a discount from the merchant 108 or other third-party entity 108 (e.g., an automobile insurance discount, a health insurance discount, or the like). For example, the authentication module 301 may cooperate with the exchange module 202 to provide the authorized information.

In certain embodiments, an authentication module 301 may provide a merchant 108 or other third-party entity 108 with one or more histories for the user (e.g., length of time a user has had one or more social media accounts, business accounts, email accounts, financial accounts, or the like), in order to assess a credit risk of the user, an identity of the user, or the like. In a further embodiment, an authentication module 301 may verify presence of a user (e.g., based on a GPS or other sensor of a hardware computing device 102) during a transaction (e.g., as a "person present" and/or "card present" factor in the transaction, to lower a cost of the transaction, to prompt a user, to deny a transaction, to allow a transaction, or the like.

In one embodiment, the authentication module 301 receives a user's electronic credentials for a third-party financial institution 114 or other third-party entity 108 from the user on a hardware computing device 102 of the user. In embodiments where a payment module 104 comprises hardware (e.g., a semiconductor integrated circuit device such as an FPGA, an ASIC, or the like), the authentication module

301 may comprise dedicated security hardware for storing and/or processing electronic credentials, transaction data, and/or other sensitive and/or private data, such as a secure cryptoprocessor (e.g., a dedicated computer on a chip or microprocessor embedded in a packaging with one or more physical security measures) which does not output decrypted data to an unsecure bus or storage, which stores cryptographic keys, a secure storage device; a trusted platform module (TPM) such as a TPM chip and/or TPM security device; a secure boot ROM or other type of ROM; an authentication chip; or the like.

In another embodiment, the authentication module 301 may store and/or process electronic credentials, transaction data, and/or other sensitive data in a secure and/or encrypted way using software and/or hardware of a user's existing hardware computing device 102 (e.g., encrypting data in RAM, NAND, and/or other general purpose storage) with or without dedicated security hardware. In certain embodiments, the authentication module 301 may encrypt and/or secure data (e.g., electronic credentials, transaction data, or the like) associated with a first user that is received by, processed by, and/or stored by a second (e.g., different) user's hardware computing device 102 (e.g., from the first user's hardware computing device 102 over the data network 106 or the like), preventing the second user from accessing the first user's data while still allowing the first user's data to be downloaded and/or aggregated from a different user's hardware computing device 102.

In one embodiment, as described above, electronic credentials may comprise one or more of a username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or other information whereby the authentication module 301 may authenticate and/or validate an identity of and/or an authorization of a user.

The authentication module 301, in certain embodiments, may receive different credentials from a user for different accounts of the user with different financial institutions 114 or other third-party entities 108 so that the payment module 104 verify funds; download, aggregate, and/or combine the user's data; or the like from the multiple different financial institutions 114 or other third-party entities 108. In one embodiment, as described below with regard to the password manager module 306, the authentication module 301, instead of and/or in addition to receiving one or more passwords or other electronic credentials from a user, may manage and/or determine one or more passwords or other electronic credentials for a user for one or more financial institutions 114 or other third-party entities 108. For example, in certain embodiments, the authentication module 301 may receive an initial set of electronic credentials (e.g., a username and a password) from a user for an account of the user with a financial institution 114 or other third-party entity 108, and the authentication module 301 may use the initial set of electronic credentials to access the user's account to set a new password (e.g., a more complex and/or more secure password), determined by the authentication module 301, or the like. The authentication module 301, in one embodiment, may determine passwords or other electronic credentials that are more secure than those typically created by and/or memorable to a user (e.g., longer, more numbers, greater variation between capital and lowercase letters, more frequently changed, or the like).

In one embodiment, the local authentication module 302 secures and/or authenticates the user's access to downloaded data, to stored passwords, and/or other data on a user's hardware computing device 102, transferred to and/or from a user's hardware computing device 102, or the like. For example, the local authentication module 302 may cooperate with one or more security and/or authentication systems of the user's hardware computing device 102, such as a PIN, password, fingerprint authentication, facial recognition, or other electronic credentials used by the user to gain access to the hardware computing device 102. In a further embodiment, the local authentication module 302 may authenticate a user before allowing the interface module 313 to provide the user access to initiate a transaction, access downloaded/aggregated data and/or alerts or other messages. For example, the local authentication module 302 may manage and/or access electronic credentials associated with the payment module 104, for a user, and may authenticate the user in response to the user accessing an application and/or service of the payment module 104 (e.g., in order to enter a transaction, or the like).

In one embodiment, the network authentication module 304 receives and/or stores a user's electronic credentials for one or more financial institutions 114 and/or other third-party entities 108 on a hardware computing device 102 of the user, on a backend server 110, or the like. The network authentication module 304, in various embodiments, may receive a user's electronic credentials from the user, from a hardware computing device 102 of the user, from a backend server 110, or the like. The network authentication module 304 may cooperate with the access module 307 to provide a user's electronic credentials to a server 108 of a financial institution 114 and/or another third-party entity 108 (e.g., the network authentication module 304 may provide electronic credentials to the access module 307 to provide to a server 108 (e.g., using an electronic interface such as an API or an HTML, web interface, or the like), the network authentication module 304 may provide electronic credentials directly to a server 108, or the like), in order for the validation module 204 to verify the availability of funds, or the like.

The network authentication module 304, in certain embodiments, may cooperate with the local authentication module 302 to encrypt and/or otherwise secure a user's electronic credentials for one or more financial institutions 114 and/or other third-party entities 108, on a hardware computing device 102 of a user, on a data network 106, on a backend server 110, while being provided to a server 108 of a financial institution 114 or other third-party entity 108, or the like. In a further embodiment, the network authentication module 304 ensures that a user's electronic credentials are only stored on a user's hardware computing device 102 and sent from the user's hardware computing device 102 to a server 108 of a third-party entity 108, and does not store a user's electronic credentials on a backend server 110, on a different user's hardware computing device 102, or the like.

In one embodiment, the password manager module 306 may manage and/or store electronic credentials of a user for a plurality of financial institutions 114, merchants 108, and/or other third-party entities 108, so that the access module 307 may access and/or download data associated with the user from each of the plurality of third-party entities 108. The password manager module 306, in certain embodiments, may generate and/or otherwise manage different, secure, credentials for each of a plurality of third-party entities 108 (e.g., financial institutions 114, merchants 108, or the like).

The password manager module 306, in one embodiment, may securely store generated credentials for a user on a hardware computing device 102 of the user, so that the user does not have to remember and enter the generated electronic credentials each time the user authenticates. For example, in addition to allowing an access module 307 to access a financial institution 114 or other third-party entity 108 using generated electronic credentials, the password manager module 306 may automatically populate one or more interface elements of a form on a webpage with electronic credentials (e.g., a username, a password) of the user, in response to the user visiting the web page in a web browser, or the like, without the user manually entering the electronic credentials. The password manager module 306, in certain embodiments, may periodically update (e.g., regenerate different credentials, such as a different password, and update the user's account with the third-party entity 108 with the regenerated different credentials) electronic credentials for a user, such as every week, every month, every two months, every three months, every four months, every five months, every six months, every year, every two years, in response to a user request, in response to a request from a financial institution 114, a merchant 108, and/or another third-party entity 108, and/or over another time period or in response to another periodic trigger.

The password manager module 306, in one embodiment, may synchronize a user's electronic credentials (e.g., provided by the user, generated by the password manager module 306, or the like) across different hardware computing devices 102, web browsers, or the like of a user. For example, in response to a password manager module 306 and/or the user updating or otherwise changing electronic credentials, the password manager module 306 may propagate the update/change to one or more other password manager modules 306, on different hardware computing devices 102 of the user, or the like.

In one embodiment, the access module 307 accesses one or more servers 108 of one or more financial institutions 114 or other third-party entities 108, from a hardware computing device 102 of a user and/or from a backend server 110, using a user's electronic credentials from the authentication module 301. The access module 307, in certain embodiments, downloads data associated with a user (e.g., a user's account balances, a user's financial transactions, or the like) from one or more servers 108 of one or more financial institutions 114 and/or other third-party entities 108 to a hardware computing device 102 of a user and/or to a backend server 110 associated with the access module 307 (e.g., in cooperation with the validation module 204 in order to validate an availability of funds for a transaction, or the like).

The access module 307, in certain embodiments, may use an electronic interface such as an API, an HTML, web interface, or the like of a server 108 of a financial institution 114 and/or another third-party entity 108 to access the server 108 using a user's electronic credentials and/or to download data associated with the user. For example, in certain embodiments, the access module 307 may download/load a webpage from a server 108 of a financial institution 114 or other third-party entity 108, enter a username and password or other electronic credentials for a user into textboxes in a form on the webpage, submit the username and password or other electronic credentials using a submit button or other interface element of the webpage, and/or otherwise submit electronic credentials using a website to gain authorized access to financial account and/or transaction data on the server 108 associated with the user. As described below, the pattern module 308 may receive and/or provide instructions enabling the access module 307 to access a server 108 (e.g., a location or method for submitting electronic credentials, or the like).

In response to successfully authenticating with and accessing a server 108 of a financial institution 114 or other third-party entity 108 with a user's electronic credentials, the access module 307 may download data associated with the user (e.g., from a user's account or the like) from the server 108, to a hardware computing device 102 associated with the user, to a backend server 110, or the like. As described below, in certain embodiments, the pattern module 308 may receive and/or provide instructions enabling the access module 307 to download data associated with a user from a server 108 of a third-party entity 108 (e.g., a URL or other link to a location for the data, a label or other identifier for locating the data within one or more webpages or other data structures, or the like). The access module 307, in certain embodiments, may follow instructions from a pattern module 308 to authenticate and/or access data from one or more webpages from a server 108 in a screen scraping manner, parsing one or more webpages to locate an entry location and/or submit electronic credentials; to locate, download, and/or extract data associated with a user; or the like (e.g., when an API for the server 108 is not available, or the like).

In one embodiment, the access module 307 sends or otherwise submits electronic credentials and/or receives or otherwise downloads data using an API or other access protocol of a server 108 of a financial institution 114 or other third-party entity 108. For example, the access module 307 may send a request in a format specified by and/or compatible with a server 108 (e.g., an API server 108) of a financial institution 114 or other third-party entity 108. The sent request may comprise electronic credentials for a user or a portion thereof (e.g., a username and/or a password), a subsequent request may comprise electronic credentials for a user or a portion thereof (e.g., in response to receiving an acknowledgment from the server 108 for the first request, or the like), and/or the access module 307 may use a different access protocol of a server 108.

In response to a request for data from the access module 307 (e.g., in response to the access module 307 authenticating a user using an access protocol of a server 108), a server 108 of a financial institution 114 or other third-party entity 108 may send and/or return data associated with a user (e.g., in one or more messages, packets, payloads, as a URL or other pointer to a location from where the access module 307 may retrieve the data, or the like). The access module 307, in various embodiments, may receive data associated with a user directly from a server 108 of a financial institution 114 or other third-party entity 108 over a data network 106; may receive a pointer, URL or other link to a location of data associated with a user from a server 108; may receive data associated with a user from another entity on a data network 106 (e.g., in response to a request from the server 108 of the third-party entity 108 to the other entity or the like); or may otherwise receive data associated with a user according to an access protocol of a financial institution 114 or other third-party entity 108.

In one embodiment, a financial institution 114 or other third-party entity 108 provides an access module 307 with an API or other access protocol. In a further embodiment, an access module 307 may act as a wrapper for and/or a plugin or extension of, an application of a financial institution 114 or other third-party entity 108 (e.g., a mobile application), and the application may have access to an API or other access protocol of the third-party entity 108. In another embodiment, an access module 307 may be configured to use an API or other access protocol in a same manner as an application of a financial institution 114 or other third-party entity 108 (e.g., a mobile application), through observation of the application of the third-party entity 108 or the like. In certain embodiments, an access module 307 may cooperate with an application of a financial institution 114 or other third-party entity 108, a web browser through which a user accesses services of a third-party entity 108, or the like to access data associated with a user (e.g., accessing data already downloaded by an application and/or user, accessing a database or other data store of an application and/or web browser, scanning and/or screen scraping a web page of a third-party entity 108 as a user accesses the web page, or the like).

The access module 307, in certain embodiments, may access different financial institutions 114 or other third-party entities 108 in different manners. For example, a first financial institution 114 or other third-party entity 108 may grant the access module 307 with access to an API or other access protocol, while the access module 307 may use an HTML, web interface (e.g., screen scraping) to access and download data from a second financial institution 114 or other third-party entity 108, or the like. In one embodiment, a remote backend server 110 may be associated with a first party service provider 110 (e.g., a vendor and/or provider of a payment module 104) and the access module 307 may download data associated with a user from both the first party service provider 110 and from one or more third-party entities 108, aggregating the data together so that the user may access the data in a single interface and/or application. For example, as described below with regard to the interface module 313, the interface module 313 may provide a user access to the user's personal financial information within a single personal financial management application and/or online banking application, or the like.

The access module 307, in certain embodiments, may store downloaded and/or aggregated data independently from the one or more third-party entities 108. For example, the access module 307 may store a user's downloaded and/or aggregated data on a hardware computing device 102 of the user, on a backend server 110 accessible by the user, or the like. In this manner, in certain embodiments, a user may control and/or access the user's data, even if a third-party entity 108 closes down or is not available, may use the user's data in any manner desired by the user even if the use is not supported by a third-party entity 108, or the like.

The access module 307, in one embodiment, in addition to and/or instead of downloading data from one or more third-party entities 108, may upload data to and/or change one or more settings of one or more financial institutions 114 or other third-party entities 108, in response to user input or the like. For example, in embodiments where the data comprises financial transactions or other financial data, the access module 307 may schedule a bill pay or other payment or funds transfer, remotely deposit a check (e.g., by uploading photos of the front and/or back of the check, or the like), and/or perform another action.

The access module 307 may update or change a user's account information with a financial institution 114 or other third-party entity 108, such as an account type or plan, credit card or other payment information associated with an account, a phone number or address or other contact information associated with an account, a password or other electronic credentials for an account, and/or other account information of a user for a third-party entity 108. The access module 307 may update and/or upload data in a substantially similar manner to that described herein for downloading data (e.g., determining a user's electronic credentials for a third-party entity 108, accessing a server 108 of the third-party entity 108, uploading and/or providing data to the third-party entity 108, or the like).

In one embodiment, the interface module 313 provides a user's data downloaded by the access module 307, from a hardware computing device 102 of a user (e.g., of the user associated with the downloaded data) to another entity, such as a remote server 110 or other remote device 102 unaffiliated with (e.g., not owned by, operated by, controlled by, or the like) the third-party entity 108 from which the data was downloaded, or the like. For example, the interface module 313 may provide an API or other interface to provide a user's downloaded and/or aggregated data to a hardware computing device 102 of the user, to a backend payment module 104b, to a backend server 110, to a different third-party entity 108, to a different/second hardware computing device 102 of the user, or the like.

In certain embodiments, it may be transparent and/or substantially transparent to a user (e.g., not apparent) which hardware computing device 102, 110 has downloaded data associated with the user. For example, the interface module 313 may provide downloaded data associated with a user from one hardware computing device 102 of the user to another hardware computing device 102 of the user, from a hardware computing device 102 of the user to a backend server 110 (e.g., from which the user may access the data using a web browser, an application, or the like), from a backend server 110 to a hardware computing device 102 of the user, or the like, allowing the user to access the data from a different location than the location to which the data was downloaded.

In one embodiment, the pattern module 308 determines an ordered list (e.g., a pattern, a script, or the like) of multiple locations on one or more servers 108 of a financial institution 114 or other third-party entity 108 for the access module 307 to access the server 108 (e.g., which may include locations other than where the data of the user is stored and/or accessible), one or more delays for the access module 307 to wait between accessing locations on the server 108, and/or other components of an access pattern for accessing data of a server. Locations, in certain embodiments, comprise independently addressable and/or accessible content and/or assets provided by one or more servers of a financial institution 114 or other third-party entity 108, or the like, such as webpages, portions of a webpage, images or other data files, databases or other data stores, pages or sections of a mobile application, or the like. For example, one location may be a location of an account balance of a user's account on a web page for a financial institution 114 or other third-party entity 108 (e.g., an HTML web interface, or the like). The pattern module 308, in one embodiment, determines a pattern/ordered list that contains one or more locations and/or delays that are not necessary for the access module 307 to access or use in order to download desired data, but instead, the pattern/ordered list may make it difficult or impossible for the financial institution 114 or other third-party entity 108 to distinguish between the access module 307 accessing a server of the financial institution 114 or other third-party entity 108 and a user accessing the server of the third-party entity.

The pattern module 308, in one embodiment, may determine and/or select the multiple locations and/or the one or more delays (e.g., a pattern/ordered list) based on an average pattern or a combined pattern identified in or based on behavior of multiple users accessing a financial institution 114 or other third-party entity 108 using a web browser, a mobile application, or the like. The pattern module 308, in one embodiment, may monitor one or more users (e.g., for a predetermined period of time or the like) as they access a server 108 of a financial institution 114 or other third-party entity 108, tracking which links, data, webpages, and/or other locations the one or more users access, how long the one or more users access different locations, an order in which the one or more users access locations, or the like. In certain embodiments, the one or more monitored users may be volunteers, who have provided the pattern module 308 with authorization to temporarily or permanently monitor the users' access, in order to provide a more realistic access pattern for the access module 307 to use to access a server 108 of a financial institution 114 or other third-party entity 108.

In a further embodiment, the pattern module 308 determines and/or selects multiple locations and/or one or more delays between accessing different locations based on a pattern identified in behavior of the user associated with the hardware computing device 102 on which the pattern module 308 is disposed, accessing the financial institution 114 or other third-party service provider 108 using a web browser, a mobile or desktop application, or other interface of the user's hardware computing device 102. For example, the pattern module 308 may comprise network hardware of the user's hardware computing device 102 (e.g., a network access card and/or chip, a processor, an FPGA, an ASIC, or the like in communication with the data network 106 to monitor data and/or interactions with a server 108 of a financial institution 114 or other third-party entity 108), a web browser plugin or extension, a mobile and/or desktop application executing on a processor of the user's hardware computing device 102, or the like. The pattern module 308 may request and receive authorization from the user to monitor the user's activity with regard to one or more servers 108 of one or more financial institutions 114 or other third-party entities 108 from the user's hardware computing device 102.

The pattern module 308, in certain embodiments, may update a pattern/ordered list over time, based on detected changes in access patterns of one or more users or the like. In one embodiment, the pattern module 308 may coordinate and/or cooperate with the access repair module 310, described below, to update a pattern/ordered list in response to a server 108 of a financial institution 114 or other third-party entity 108 and/or data associated with a user becoming broken and/or inaccessible.

In one embodiment, the access repair module 310 detects that access to a server 108 of a financial institution 114 or other third-party service 108 and/or data associated with a user is broken and/or becomes inaccessible. The access repair module 310, in certain embodiments, provides an interface to a user allowing the user to graphically identify an input location for the user's electronic credentials, a location of data associated with the user (e.g., an account balance, a transaction history, a financial statement, or the like). For example, the access repair module 310 may provide a GUI, a command line interface (CLI), an API, and/or another interface allowing an end user to identify an input location for electronic credentials, an action for submitting electronic credentials, a location of data, or the like. The access repair module 310, in one embodiment, provides an interface to a user on a hardware computing device 102 of the user.

In certain embodiments, for example, the access repair module 310 may overlay an interface over one or more pages of a web site of a financial institution 114 or other third-party entity 108 on an electronic display screen of a user's hardware computing device 102. The access repair module 310 may provide one or more interfaces (e.g., GUIs, CLIs, APIs, overlays, or the like) to multiple users, allowing multiple users to define a repair and/or update for access to a server of a financial institution 114 or other third-party entity 108 (e.g., from different hardware computing devices 102 or the like over a network 106).

The access repair module 310, in certain embodiments, may determine and/or display one or more suggestions and/or recommendations for the user, which the user may either confirm or change/correct (e.g., in a basic interface, a standard interface, a beginning user interface, or the like). For example, the access repair module 310 may display one or more interface elements with a suggested location for a user to enter a username, a suggested location for a user to enter a password, a suggested credential submit action, a suggested location of data associated with the user (e.g., an account balance, a transaction history, a financial statement, or the like), and/or one or more other interface elements allowing a user to graphically identify one or more locations within a website of a financial institution 114 or other third-party entity 108.

The access repair module 310, in certain embodiments, processes one or more pages of and/or other locations on a server 108 (e.g., one or more websites, web apps, or the like) to determine an estimate and/or prediction of an input location for a user's electronic credentials, an action for submitting a user's electronic credentials, a location of data associated with a user, or the like. In one embodiment, the access repair module 310 may estimate one or more locations and/or actions (e.g., by scanning and/or parsing one or more pages of a web site, based on input from other users accessing one or more pages of a website, based on previous interactions of the user with one or more pages of a website, a prediction made using a machine learning and/or artificial intelligence analysis of a website, based on a statistical analysis of historical changes to one or more pages of a website and/or of one or more similar websites, or the like). The access repair module 310 may display to a user in an interface an estimate and/or prediction of an input location for the user's electronic credentials, a location of data associated with the user, or the like so that the user may confirm whether or not the estimate and/or prediction is correct using the interface.

The access repair module 310 may indicate one or more estimated locations and/or actions with an arrow or other pointer to a location; a link or other identifier of a location; a box or other highlighting around a location; by altering text labeling for a location to make the text bold, italic, and/or underlined; or the like. A user, in certain embodiments, may click, select, or otherwise identify a location to either confirm or change/correct a location suggested by the access repair module 310. For example, a user may click or otherwise select an interface element associated with a location and/or action and may click or otherwise select the location and/or perform the action, which the access repair module 310 may record (e.g., automatically populating a text field identifying the location and/or action, recording a macro allowing the action to be automatically repeated without the user, for a different user, or the like).

In certain embodiments, instead of or in addition to a standard, basic, or beginning user interface, the access repair module 310 may provide an advanced interface, for experienced users or the like, with source code of a website and/or other details of the website. For example, in one embodiment, an advanced access repair interface may allow one or more advanced users to identify one or more locations and/or actions within source code of a website, which may not be visible and/or readily apparent in the website itself. In certain embodiments, the access repair module 310 may provide a user interface element allowing a user to select and/or toggle between a standard user interface or view and an advanced user interface or view.

In one embodiment, the hierarchy module 312 provides the access module 307 with an ordered list of multiple different sets of instructions for accessing a server 108 of a financial institution 114 or other third-party entity 108 using a user's electronic credentials, for downloading data associated with the user, or the like. Each different set of instructions, in certain embodiments, comprises a location for entering a user's electronic credentials, an instruction for submitting the user's electronic credentials, one or more locations of the data associated with the user, or the like.

The hierarchy module 312, in one embodiment, may receive one or more sets of instructions from a backend server 110 (e.g., a backend payment module 104b of a backend server 110), from another user hardware computing device 102 in a peer-to-peer manner (e.g., a payment module 104a of a user hardware computing device 102), from a test module 318, or the like. The hierarchy module 312, in certain embodiments, may receive multiple different sets of instructions already in an ordered list (e.g., a global hierarchical order) based on a history of successful and/or unsuccessful uses of the different sets of instructions by different user hardware computing devices 102 and/or users, or the like. In one embodiment, the hierarchy module 312 may determine a hierarchy for and/or create an ordered list from multiple different sets of instructions for a single user (e.g., a custom or individualized hierarchy) based on a history of successful and/or unsuccessful uses of the different sets of instructions by the user (e.g., from one or more hardware computing devices 102 of the user).

The access module 104, in one embodiment, may iterate through an ordered list of multiple sets of instructions for accessing a server 108 of a financial institution 114 or other third-party entity 108, in the order of the list, until one of the sets of instructions is successful and the access module 104 is able to access and/or download data from the financial institution 114 or other third-party entity 108. The hierarchy module 312, in one embodiment, may place a most recent successfully used set of instructions at the top (e.g., as the first set to try). For example, the hierarchy module 312 for a user's hardware computing device 102 may place a set of instructions for accessing a financial institution 114 or other third-party entity 108 at the top of a list (e.g., adjusting an order of the list over time) in response to the access module 307 successfully accessing and/or downloading data from the financial institution 114 or other third-party entity 108 using the set of instructions. In certain embodiments, the hierarchy module 312 may receive an ordered list of multiple different sets of instructions for accessing a server 108 of a financial institution 114 or other third-party entity 108 in a first order (e.g., a global order) and may dynamically adjust and/or rearrange the different sets of instructions over time based on a single user's/hardware computing device 102's use (e.g., moving a set of instructions up in the list if access using the set of instructions is successful for the user/hardware computing device 102, moving a set of instructions down in the list if access using the set of instructions is unsuccessful for the user/hardware computing device 102, or the like).

The hierarchy module 312, in certain embodiments, may be configured to share one or more sets of instructions, an ordered list of multiple sets of instructions, or the like with a hierarchy module 312 of another user's hardware computing device 102 over a data network 106 (e.g., directly to the other user's hardware computing device 102 in a peer-to-peer manner, indirectly by way of a backend payment module 104b of a backend server 110, or the like). Different sets of instructions may be successful or unsuccessful for different users, in various embodiments, due to different account types, different account settings, different originating systems (e.g., due to a corporate acquisition or the like, different users of the same financial institution 114 or other third-party entity 108 may have one or more different settings, different access methods, or the like), system changes or upgrades, and/or another difference in accounts, services, or the like for different users of the same financial institution 114 or other third-party entity 108.

In certain embodiments, the interface module 313 provides a graphical user interface (GUI) on a hardware computing device 102 of a user, and provides transaction data and/or downloaded data associated with the user to the user through the GUI (e.g., allowing the user to authenticate, enter transactions, view transaction data, providing one or more notifications and/or recommendations to the user based on the data, providing one or more tables or charts to the user based on the data, providing a summary of or one or more statistics related to the data, or the like).

For example, in one embodiment, where the data associated with a user comprises the user's financial transaction history (e.g., purchases and/or other financial transactions, or the like), the interface module 313 may provide a personal financial management interface, with a list of transactions, one or more budgets, one or more financial goals, a debt management interface, a net worth interface, and/or another personal financial management interface wherein the user may view the user's financial transaction history, and/or alerts or recommendations based thereon.

The interface module 313, in certain embodiments, may provide one or more access controls to a user, allowing the user to define which devices 102, users, merchants 108, third-party entities 108, or the like may access which data. For example, the interface module 313 may provide an interface for a user to allow and/or restrict certain mobile applications, certain APIs for third-party services, certain plugins or extensions, certain users, certain hardware computing devices 102, and/or one or more other entities 108, 114 to access transaction data for the user (e.g., with access controls by third-party entity 108 or other data source, by data type, by entity requesting access, and/or at another granularity). In this manner, the payment module 104, in certain embodiments, may comprise a local repository of transaction data, which one or more other devices 102 and/or services may access and use, with a user's permission.

In one embodiment, the route module 314 determines whether a hardware computing device 102 of a user, a backend server 110, or the like is available for the access module 307 to validate availability of funds and/or download data associated with the user from a server 108 of a financial institution 114 or other third-party entity 108. The route module 314, in certain embodiments, may access a server 108 of a financial institution 114 or other third-party entity 108, from a remote backend server 110, using the user's electronic credentials, to validate an account balance and/or download data associated with the user from the server 108 to the remote backend server 110 in response to the route module 314 determining that the hardware computing device 102 of the user is unavailable, or the like. The route module 314, in one embodiment, provides a user one or more alerts (e.g., downloaded data from a third-party entity 108, a recommendation or suggestion determined based on data from a third-party entity 108, a notification or other alert based on an event or other trigger detected in data from a third-party entity 108, or the like) on a hardware computing device 102 of the user based on the data associated with the user downloaded to the remote backend server 110.

In certain embodiments, the route module 314 maintains and/or stores a list of multiple hardware computing devices 102 associated with a single user and/or account. In response to determining that one hardware computing device 102 associated with a user and/or account is unavailable (e.g., powered down, in airplane mode, not connected to the data network 106, or the like), the route module 314 may access a server 108 of a financial institution 114 or other third-party entity 108 from a different, available hardware computing device 102 of the user and/or account, may provide one or more notifications or other alerts on a different, available hardware computing device 102, or the like.

The route module 314, in one embodiment, may alternate or rotate between multiple hardware computing devices 102, 110 (e.g., of the same user) for downloading data for the same user from a third-party entity 108 periodically. For example, rotating and/or alternating devices 102, 110 from which data is downloaded, may decrease a likelihood that the downloading will be misinterpreted as fraudulent or improper. In another embodiment, the route module 314 may download data from the same device 102, 110 (e.g., a primary hardware computing device 102 of a user, a backend server 110, or the like), which may be authorized and/or identified by the third-party entity 108 as a trusted device, or the like.

In one embodiment, the frequency module 316 sets a frequency with which the access module 307 accesses the server 108 of a financial institution 114 or other third-party entity 108. The frequency module 316, in certain embodiments, determines a frequency based on input from a remote backend server 110, which may be unaffiliated with the financial institution 114 or other third-party entity 108 being accessed, so that the remote backend server 110 (e.g., the frequency module 316 executing on the remote backend server 110) determines frequencies for a plurality of access modules 307 for different users and/or different hardware computing devices 102. For example, the frequency module 316 may limit a single user and/or hardware computing device 102 from accessing the same financial institution 114 or other third-party entity 108 more than an allowed threshold number of times within a time period (e.g., once every ten minutes, once every half an hour, once every hour, twice a day, three times a day, four times a day, or the like). The frequency module 316, in certain embodiments, limits an access frequency to prevent inadvertent denial of service by a financial institution 114 or other third-party entity 108, or the like.

The frequency module 316, in certain embodiments, may dynamically adjust a frequency with which a user and/or hardware computing device 102 may access a financial institution 114 or other third-party entity 108 over time. For example, the frequency module 316 may monitor access and/or downloads by multiple users (e.g., all users, available users, active users, or the like) to cap or limit a total access and/or download bandwidth for each of the different third-party entities 108 (e.g., so as not to overwhelm any single financial institution 114 or other third-party entity 108, or the like). In this manner, in one embodiment, a user and/or hardware computing device 102 may access and/or download data with a higher frequency when fewer other users and/or hardware computing devices 102 are accessing and/or downloading data (e.g., low peak times), but may be limited to a lower cap or access frequency when more other users and/or hardware computing devices 102 are accessing and/or downloading data (e.g., high peak times).

In a further embodiment, the frequency module 316 determines a frequency based on input from a user, allowing the user to set the access frequency independently of other users and/or of a backend server 110. The frequency module 316 may provide a user interface (e.g., a GUI, CLI, API, or the like) allowing a user to set and/or adjust an access frequency for downloading data from one or more financial institutions 114 or other third-party entities 108 using one or more hardware computing devices 102 (e.g., providing different settings allowing the user to set different access frequencies for different third-party entities 108, different hardware computing devices 102 of the user, or the like).

In one embodiment, the test module 318 cooperates with the access repair module 310 to verify whether or not one or more received locations and/or instructions from a user are accurate (e.g., usable to access data from a server 108 of a financial institution 114 or other third-party entity 108). The test module 318, in certain embodiments, attempts to access a server 108 of a financial institution 114 or other third-party entity 108 for a plurality of different users (e.g., a sample group or test set), based on an identification the access repair module 310 received from a single user, using electronic credentials of the different users or the like.

The test module 318, in certain embodiments, determines whether data associated with the different users (e.g., a sample group or test set) is accessible using the identification from the single user. The test module 318 may repeatedly attempt to access data from a financial institution 114 or other third-party entity 108 using identifications which the access repair module 310 received from different users (e.g., on different hardware computing devices 102 and sent to the test module 318 on a single hardware computing device 102 over the data network 106, sent to multiple test modules 318 on different hardware computing devices 102 over the data network 106, sent to a test module 318 on a central backend server 110, or the like).

The test module 318, in one embodiment, provides one or more identifications from a user to other instances of the access module 307 (e.g., other test modules 318) for accessing a server 108 of a financial institution 114 or other third-party entity 108 in response to an amount of the different users (e.g., a sample group or test set) for which data is accessible using the identification from the single user satisfying a threshold. For example, if the identification from the single user successfully allows a predefined number of other test users (e.g., 2 users, 10 users, 100 users, 1000 users, 50% of test users, 75% of test users, and/or another predefined threshold number of test users) to access their data from a third-party entity 108, the test module 318 may provide instructions based on the identification to more users (e.g., all or substantially all users, or the like).

In certain embodiments, the test module 318 may successively increase a test size comprising a number of users to which the test module 318 provides instructions for accessing their data from a financial institution 114 or other third-party entity 108 using an identification from a single user (e.g., starting with one or more test users, increasing to two or more, three or more, four or more, five or more, ten or more, twenty or more, thirty or more, forty or more, fifty or more, one hundred or more, five hundred or more, one thousand or more, five thousand or more, ten thousand or more, one hundred thousand or more, a million or more, and/or other successively increasing numbers of test users). The test module 318, in one embodiment, includes instructions based on an identification from a single user in an ordered list of multiple different sets of instructions for accessing a server 108 of a financial institution 114 or other third-party entity 108, as described in greater detail with regard to the hierarchy module 312.

The test module 318, in certain embodiments, is configured to prioritize identifications from one or more users based on one or more trust factors for the one or more users (e.g., scores or the like). A trust factor, in one embodiment, may comprise a score or other metadata indicating a likelihood that a user's identification is correct. For example, in various embodiments, a trust factor may include and/or be based on one or more of a history of a user's previous identifications (e.g., correct or incorrect), a user's affiliation with a provider (e.g., a creator, a vendor, an owner, a seller, a reseller, a manufacturer, the backend server 110, or the like) of the one or more payment modules 104, positive and/or negative indicators (e.g., votes, likes, uses, feedback, stars, endorsements, or the like) from other users, and/or other indicators of whether or not a user's identification is likely to be correct. The test module 318 may determine how many other users to provide a user's identification based on one or more trust factors associated with the user (e.g., accelerating a rate at which a user's identification is provided to other users in response to a higher trust factor, decreasing a rate at which a user's identification is provided to other users in response to a lower trust factor, or the like).

The test module 318 may provide an override interface, allowing an administrator, moderator user, or the like to remove an identification, adjust and/or override an identification, adjust and/or override a trust factor for a user, ban a user from providing identifications, and/or otherwise override a user or a user's identification. In various embodiments, the test module 318 may provide an override interface to an administrator and/or moderator as a GUI, an API, a CLI, or the like.

In certain embodiments, the test module 318 causes the one or more payment modules 104 and their aggregation services to be self healing, self testing, and/or self incrementally deploying, as it tests and uses the most effective solutions, or the like (e.g., sets of instructions based on indications from one or more users).

In one embodiment, the item level data module 320 receives, downloads, aggregates, and/or stores item level data for transactions from one or more merchants 108 and/or other third-party entities 108. In certain embodiments, item level data comprises identification of one or more sub-items that form part of a larger item. For example, item level data may comprise identifiers for one or more individual items (e.g., goods and/or services) which a user purchased within a larger, single transaction. An item level identifier for one or more individual items may include one or more of the item's name, stock keeping unit (SKU) identifier, universal product code (UPC), international article number (EAN), global trade item number (GTIN), cost/price, or the like.

Item level data, in certain embodiments, may not be available from certain third-party entities 108. For example, a financial institution 114 may provide the item level data module 320 with a list of one or more transactions, including one or more of a date, an amount, a location or vendor, or the like for each transaction, but without any item level information for items within a transaction. In order to download and/or aggregate item level data for a transaction, in one embodiment, the item level data module 320 may receive item level data for a transaction from a hardware payment device 112 of a merchant 108, exchanged by an exchange module 202 as part of the transaction, or the like (e.g., as part of an electronic receipt or other metadata associated with the transaction).

In some embodiment, the item level data module 320 may supplement item level data received as part of a transaction (e.g., in order to aggregate additional item level data for other transactions or the like) by using a user's electronic credentials to access a merchant 108 or other third-party entity 108 associated with an identified transaction, such as an online shopping or e-commerce web site; an audio, video, and/or other digital media website; a loyalty and/or rewards website for a retail store; or the like, to access and download item level information for items within a transaction (e.g., by accessing the user's purchase history, transaction history, order history, account history, viewing or listening history, or the like over an API and/or HTML, web interface).

For example, the item level data module 320 may download item level data comprising movies and/or television shows purchased and/or viewed, eBooks purchased and/or read, or the like from a digital media provider's website, such as Apple® iTunes®, Google® Play®, Netflix®, Hulu®, Amazon®, or the like, even if the associated payment were not made using the payment module 104, aggregating the downloaded item level data together with other item level data received by the exchange module 202 during transactions so they are accessible to the user together. The item level data module 320 may download item level data comprising physical goods or other items purchased from an online retailer's website, such as Amazon® or the like. The item level data module 320 may download item level data comprising menu items ordered from a restaurant's loyalty and/or rewards website; may download item level data for individual goods purchased from a grocery store, department store, hardware store, or the like's loyalty and/or rewards website, from a store credit card account website, or the like.

The item level data module 320 may automatically click or select one or more individual items within a listed history, and download the resulting item level data for the item, returning to the listed history and repeating for each listed item or the like, using an access pattern and/or screen scrape as described above. In certain embodiments, in response to determining that item level data for a transaction is not available from a third-party entity 108 and/or in response to a request from a user, the item level data module 320 may use a camera of a hardware computing device 102, a scanner, or the like to photograph and/or scan a paper receipt from a third-party entity 108, and may use optical character recognition or the like to determine item level data from the receipt, instead of and/or in addition to downloading item level data from one or more third-party entities 108.

In one embodiment, the item level data module 320 may correlate downloaded and/or aggregated transaction data that does not have item level data (e.g., from a financial institution 114, from a financial transaction data aggregation server 110, or the like) with item level data received by an exchange module 202 as part of a transaction and/or downloaded from a particular third-party entity 108 with which the transaction occurred. For example, the item level data module 320 may match a location and/or vendor identifier or portion thereof listed in transaction data, with the actual third-party entity 108 with which the transaction occurred, access item level data from the third-party entity 108, and match the transaction data to the item level data based on a transaction amount, a transaction date, a transaction location, a product image, a product link, a number of items, or the like. The item level data module 320 may present the item level data to the user within a personal financial management interface of the interface module 313 or the like, allowing the user to view a transaction history, with item level data for individual transactions, may categorize a transaction (e.g., for inclusion in a budget or the like) based on the item level data, may provide a recommendation and/or advertisement based on the item level data, and/or otherwise provide the item level data to the user.

As described above, in some embodiments, an item level data module 320 on a hardware computing device 102 of a user may wirelessly communicate with a hardware payment terminal 112 or other point of sale system of a brick and mortar retailer or other merchant 108 to download/receive item-level data as part of a transaction (e.g., using near field communications (NFC), Bluetooth®, Wi-Fi, a radio frequency identifier (RFID), an infrared (IR) signal protocol, a radio frequency (RF) signal protocol, a data network 106, or the like). For example, a hardware payment terminal 112 or other point of sale system of the brick and mortar merchant 108 or other third-party entity 108 may send a list of items purchased, purchase prices, or the like wirelessly to a hardware computing device 102 of a user in order for the user to make an electronic payment using a payment module 104a of the hardware computing device 102, or the like.

In one embodiment, the location module 322 tracks, monitors, and/or compares a location for a user and/or for a hardware computing device 102 for a user, based on information from a location sensor (e.g., a GPS sensor, a wireless chip, and/or another location sensor) of the hardware computing device 102 for the user (e.g., in order to enhance security, limit fraudulent transactions, provide convenient prompts and/or offers to the user based on location, or the like). For example, in dome embodiments, the location module 322 may compare a geographic location determined based on a sensor for a mobile hardware computing device 102 with a geographic location for a hardware payment device 112 and/or for a merchant 108 to validate an authenticity of a transaction between them.

In certain embodiments, the location module 322 may cooperate with the prompt module 324 described below to determine a target location and/or a target time for presenting a prompt to a user based on the user's financial transaction data and location data for the user. A target location, in various embodiments, may comprise a location where an offer or other prompt may be most likely to be accepted by a user, most likely to be noticed by a user, most likely to be usable by a user, most likely to be relevant to a user, or the like. In one embodiment, the location module 322 may select a target location where an offer or other prompt is redeemable and/or may otherwise be used, such as a location associated with a merchant 108 providing the offer, so that the user receives the offer when the user is at or near (e.g., within a selected distance) the location where the offer may be accepted and used. Such an offer and/or target location may comprise "complimentary spend" based on a user's financial transaction data (e.g., a purchase at a location that a user already frequents, but for a good and/or service the user has not previously purchased, has not purchased for a predefined amount of time, or the like).

For example, as described below, the prompt module 324 may select an offer for a good and/or service identified in a user's financial transaction data at a competitor of a merchant 108. However, if the user already frequents the merchant 108, but for a different good and/or service, the location module 322 may select a location associated with the merchant 108 as a target location for an offer for the good and/or service previously purchased from the competitor, may select a location associated with the competitor as a target location for the offer, or both. As described above, in certain embodiments, the item level data module 320 may process financial transaction data identifying specific items a user has purchased (e.g., the item's name, SKU, UPC, EAN, GTIN, cost/price, or the like), which may allow the location module 322 to provide more accurate product-level targeting. By monitoring the user's location data in real time, in certain embodiments, the location module 322 may allow offers or other prompts to be dynamically targeted and provided to a user at optimal locations and/or times, based on the user's own financial transaction data and location data.

In one embodiment, the location module 322 may select a location of a competing merchant 108 of a merchant 108 of an offer as a target location for presenting the offer, because the user is likely to be purchasing goods and/or services also available from the merchant 108, and the user's financial transaction data may indicate that the user has purchased from the competing merchant 108 with at least a selected frequency in the past, or the like. In a further embodiment, the location module 322 may select as a target location a place where the user has at least a selected likelihood of being on route to a competing merchant 108 of the merchant 108 of the offer, as the user may be more likely to re-route to the location of the merchant 108 while further away from the competing merchant 108 (e.g., such that the offer is presented to the user as early as possible, with at least a selected level of certainty that the user is en route to a competitor's location). Accordingly, in certain embodiments, a target location may comprise and/or be associated with a target time (e.g., absolute, relative) determined by the location module 322, selected by a merchant 108, or the like.

For example, in one embodiment, the location module 322 may determine, based on location data and/or on a user's financial transaction data, that the user has a 90% chance of being on route to a selected competitor when traveling in a certain direction on a certain road at a certain time on a certain day, and the location module 322 may select the certain direction on the certain road at the certain time on the certain day as the target location for an offer or other prompt by the prompt module 324. In one embodiment, a provider of an offer (e.g., a merchant 108 or the like) may provide one or more parameters for a target location to the location module 322, such as a threshold likelihood that the user is en route to a competitor, an identity of a competitor, a geographic region for a target location, or the like.

In certain embodiments, the location module 322 may determine a target location based on one or more offers available to a user based on the user's financial transaction data. In some embodiments, a target location comprises a physical location, such as a brick-and-mortar store, a mall, an airport, a restaurant, or other physical location for a merchant 108. In certain embodiments, a target location comprises an online location, such as a website, a chat room, a social media network, or the like, where the prompt module 324 may provide an offer or other prompt. In various embodiments, a target location comprises a location associated with a competitor of a provider of an offer (e.g., the company, organization, entity, or other merchant 108 that provides the offer).

In certain embodiments, the location module 322 is configured to monitor location data from one or more sensors for a user relative to a target location, in embodiments where the target location comprises a physical location (e.g., to determine when the user has arrived at a target location, when the user is approaching a target location, when the user has arrived within a selected distance of the target location, or the like). The one or more sensors may include GPS sensors, proximity sensors, wireless beacons, network adapters, and/or other sensors configured to determine location data for a user. The one or more sensors may comprise part of a hardware computing device 102 for the user, such as a smart phone, tablet computer, laptop computer, smart watch, desktop computer, or the like. In a further embodiment, a sensor may comprise a beacon in communication with the user's hardware computing device 102 such that when the user comes within a communication proximity of the beacon, the beacon sends the location data of the beacon and/or the user's hardware computing device 102 to the location module 322.

In one embodiment, the location module 322 may dynamically provide an offer to a user at a point in a store or other physical building or other location for a merchant 108. In certain embodiments, a physical location may have beacons set up in different departments, aisles, or other areas within the location such that when the user walks into an area, a beacon in that area may send the user's location within the store to the location module 322. For example, as a user walks into the plumbing section at a home improvement store, the beacon for that area of the store may send the user's location data to the location module 322, and the prompt module 324 may dynamically provide a coupon for plumbing supplies to the user in response to the user's location satisfying the target location for the coupon.

In various embodiments, the location module 322 monitors for location data by polling the sensors at periodic intervals for location data. In a further embodiment, the location module 322 monitors for location data by receiving location data sent from the sensors (e.g., asynchronously, or the like). In certain embodiments, the location module 322 monitors for the user's online location data by monitoring a user's browsing history (e.g., using cookies, or the like, to monitor, log, and track a user's browsing activities).

In some embodiments, at least a portion of the location module 322 may be located on a user's hardware computing device 102, may be communicatively coupled to a sensor, a beacon, or the like, and may determine location data for the user's device 102. In such an embodiment, the location module 322 may provide the location data to a PFM provider of the user (e.g., a backend server 110, the interface module 313, the prompt module 324, or the like), where it may be subsequently used to determine one or more offers or other prompts to present to the user based on the location data relative to a target location for the one or more offers, or the like.

In one embodiment, the prompt module 324 is configured to prompt a user (e.g., on an electronic display screen of a hardware computing device 102, or the like) to use the payment module 104, to use a specific account or other funding source associated with the payment module 104, or the like as a funding source for a transaction (e.g., prior to the transaction occurring, or the like). For example, in some embodiments, the prompt module 324 may present and/or display a prompt is in response to a user attempting payment with a payment card (e.g., a card-based payment source) by swiping a magnetic strip of a debit or credit card, inserting a chip of a debit or credit card, placing a debit or credit card in proximity to an NFC or other wireless card reader, entering a credit card number and/or other debit or credit card payment information, or the like.

In one embodiment, a prompt module 324 executing on a hardware payment device 112 may determine that a presented payment card is associated with a user that has an account and/or a non-card-based payment source activated with a payment module 104 (e.g., matching the presented payment card with an account for an active user prior to processing the payment card for the transaction, or the like) in order to provide a prompt to the user to use a different (e.g., non-card-based) funding source. In a further embodiment, a prompt module 324 executing on a backend server 110 of a third-party financial institution 114 (e.g., an issuing financial institution 114 of the payment card, an acquiring financial institution for the merchant 108, or the like) may determine that a presented payment card (e.g., sent to the financial institution 114 over a card-based payment network, or the like) is associated with a user that has an account and/or a non-card-based payment source activated with a payment module 104, and may initially reject the presented card in order to provide a prompt to the user to use a different (e.g., non-card-based) funding source, which may have fewer fees for the financial institution 114, faster payment times for the merchant 108, or the like.

In certain embodiments, in response to a user accepting a prompt from the prompt module 324 to use a different funding source, to use the payment module 104, or the like, the payment module 104 may process the different funding source to complete the transaction. In response to the user resubmitting the same payment card for the transaction (e.g., a subsequent attempt to use the same payment card), in some embodiments, a hardware payment device 112 (e.g., a hardware payment terminal 112, a backend payment server 110 of a third-party financial institution 114, or the like) may approve the payment card and complete a card-based transaction.

The prompt module 324, in one embodiment, may prompt a user (e.g., to use a different funding source, to use the payment module 104, with an offer, or the like) on the hardware payment device 112 (e.g., an electronic display screen of hardware payment terminal 112 or the like), either directly or through a prompt to a cashier or other user to verbally suggest to the user (e.g., to use a non-card-based payment source, to use the payment module 104, or the like). In a further embodiment, a prompt module 324 executing on a hardware payment device 112 may wirelessly send a prompt from the hardware payment device 112 to the hardware computing device 102 of the user to present the prompt there (e.g., as part of an exchange of payment information by the exchange module 202 or the like), may text, email, and/or provide a push notification to the user (e.g., from a hardware payment device 112 comprising a backend payment server 110), or the like. In other embodiments, a prompt module 324 executing on a hardware computing device 102 for a user may prompt the user on an electronic display screen of the hardware computing device 102.

In one embodiment, the prompt module 324 may cooperate with the location module 322 described above, to provide a prompt in response to a location sensor (e.g., a GPS or other location sensor on a hardware computing device 102 for a user, a wireless beacon or other location sensor for a merchant 108, or the like) determining that the user, a hardware computing device 102 for the user, or the like is within a predefined distance of the merchant 108, a hardware payment device 112 for the merchant 108, or the like. For example, the prompt module 324 may provide a prompt for the user to use the payment module 104, to use a non-card-based funding source, a prompt including an offer for an incentive (e.g., a discount or other offer from a merchant 108, a reward from a financial institution 114, or the like) for the user to use the payment module 104 and/or a non-card-based funding source, or the like.

The prompt module 324, in certain embodiments, leverages a user's financial transaction data (e.g., aggregated from multiple entities 108, 114 for personal financial management purposes, or the like) to provide dynamic, customized, and/or otherwise relevant prompts, content, and/or offers to the user. In one embodiment, the prompt module 324 is configured to select a user for an offer in response to the user's financial transaction data satisfying a transaction metric associated with the offer. In a further embodiment, the prompt module 324 is configured to determine a target location for the offer based on the user's financial transaction data. In some embodiments, the prompt module 324 is configured to monitor location data from one or more sensors for the user relative to the target location, in cooperation with the location module 322 or the like. The prompt module 324, in various embodiments, is configured to dynamically display and/or otherwise provide an offer or other prompt to a user in response to monitored location data from the one or more location sensors satisfying a target location, or the like. In this manner, in certain embodiments, the prompt module 324 may provide prompts, such as offers or advertisements, to a user which are highly relevant to the user's previous and/or future purchases and which the user is likely to accept or act upon, benefiting both the user and the content provider (e.g., a merchant 108, a financial institution 114, or the like).

In one embodiment, the prompt module 324 is configured to select a user (e.g., a user of a payment module 104 or the like) for an offer or other prompt in response to the user's financial transaction data satisfying a transaction metric associated with the offer or other prompt. The user, in certain embodiments, has opted-in to have his/her financial transactions recorded and/or aggregated.

In addition to transaction data from transactions completed using the payment module 104, financial transaction data, in certain embodiments, may include financial obligations, such as mortgages, auto loans, student loans, or the like; cell-phone agreements; internet agreements; television subscriptions; utility payments; other obligations where regular, periodic payments are made according to a payment schedule; may also include purchases, such as retail purchases, online purchases, grocery purchases, home improvement purchases, gas purchases, or the like; may include item level data for individual items that the user purchased; and/or records for other types of transactions. For example, in one embodiment, when a user makes a mortgage payment or goes grocery shopping, information describing the mortgage payment, such as amount, interest rate, date of payment, amount for interest, amount for principle, or the like; or the grocery purchases, such as a total amount spent, location of grocery store, information for individual items purchased, date of purchase, or the like; may be monitored and recorded by payment module 104.

In certain embodiments, an offer or other prompt selected for a user may include one or more advertisements, coupons, promotions, discounts, rewards, rebates, incentives, and/or other marketing materials. The offer or other prompt may be related to a particular entity, such as a vendor, a service provider, a retailer, a manufacturer, an online store, a financial institution 114, and/or other merchant 108. In some embodiments, the offer or other prompt may be related to a particular product or service. The offer, in some embodiments, may be available to a user in response to the user crossing a geo-fence for a target location; making a purchase; subscribing to a service; providing information, via a survey, quiz, poll, or the like; signing-up to be a member of a program, such as a loyalty program; providing contact information; and/or fulfilling another predefined trigger.

In some embodiments, the prompt module 324 selects a user for an offer or other prompt based on the user's financial transaction data. For example, the prompt module 324 may select user A for a discount offer on home improvement products based on a recent purchase at a home improvement store, and may select user B for an offer to refinance a mortgage based on a recent mortgage payment. In one embodiment, the prompt module 324 selects a user for an offer in response to the user's financial transaction data satisfying a transaction metric associated with the offer. As used herein, a transaction metric may include a measurable or estimable quantity or unit of a financial transaction and/or series of transactions that can be used to select an offer for a user. A transaction metric may include an interest rate, a sum total spent on various types of items, a price, an interest rate, a monthly payment amount, a fee, a vehicle ownership metric, a geographical spending metric, a housing cost metric, a food spending metric, an entertainment spending metric, an income metric, a savings metric, a consistency metric, a competitor metric, a lifetime value metric, a total spend metric, a transaction interval metric, or the like.

A vehicle ownership metric, in various embodiments, may indicate, based on a user's financial transaction data, whether a user owns a vehicle, a value of a user's vehicle, a make and/or model of a user's vehicle, a model year of a user's vehicle, an amount of time a user has owned a vehicle, a number of miles of a user's vehicle, an amount spent on fuel for a user's vehicle; a date of a last maintenance of a user's vehicle; a cost of a last maintenance of a user's vehicle; a total cost of maintenance of a user's vehicle; an average cost (e.g., per month, per year) of maintenance on and/or of total ownership of a user's vehicle; a monthly loan payment amount for a user's vehicle; an original amount and/or an outstanding balance of a loan for a user's vehicle; and/or another vehicle ownership metric determined and/or inferred from a user's financial transaction data.

A geographical spending metric, in various embodiments, may indicate, based on a user's financial transaction data, a user's overall spending in one or more geographic regions, a user's categorized spending in one or more geographical regions, or the like. A geographic region, in certain embodiments, may comprise a street, a development, a district, a city, a county, a state, and/or another identifiable area. A geographical spending metric, in one embodiment, may be categorized by transaction type, with one or more categories and/or subcategories, such as home, auto, travel, financial, entertainment, medical, food, restaurant, grocery, or the like.

A housing cost metric, in various embodiments, may indicate, based on a user's financial transaction data, whether a user owns a residence, whether a user rents/leases a residence, a user's housing costs, a location of a user's residence, a mortgage interest rate for a user's residence, a mortgage balance for a user's residence, an original mortgage amount for a user's residence, a homeowner's insurance payment amount for a user, a property tax amount for a user's residence, or the like.

A food spending metric, in various embodiments, may indicate, based on a user's financial transaction data, an overall amount a user spends on food, an amount a user spends on groceries, an amount a user spends on restaurants, an amount a user spends on food from a particular entity and/or location, or the like. A food spending metric may have various time scales, such as per breakfast, per lunch, per dinner, per meal, daily, weekly, monthly, yearly, over a lifetime of the user's financial transaction data, or the like.

A transaction metric, in one embodiment, may comprise an income metric indicating a user's income (e.g., monthly, yearly, by source, gross income, disposable income, or the like). In a further embodiment, a transaction metric may comprise a savings metric indicating an amount of money a user saves (e.g., balance of a savings account; balance of an investment account; aggregated total of several savings and/or investment accounts; total amount saved; amount saved over a time period such as daily, weekly, monthly, and/or yearly; a rate of saving; or the like).

A transaction metric, in one embodiment, comprises a consistency metric indicating an amount of variation in spending of a user (e.g., variation in total spending over one or more time periods, variation in spending by category over one or more time periods, or the like). For example, in one embodiment, an offer provider or advertiser may target a user with consistent spending, for an offer, in an effort to gain a consistent, loyal customer, or the like. In a further embodiment, an offer provider or advertiser (e.g., a merchant 108 and/or a financial institution 114) may target a user with inconsistent spending (e.g., wide variations in spending week to week and/or month to month), believing that a user with inconsistent spending may be more likely to make an impulse purchase, or the like.

A competitor metric, in various embodiments, may indicate an amount a user spends at one or more specific competitors of a provider of an offer, a frequency of transactions a user makes at a competitor of a provider of an offer, one or more identities of competitors of a provider of an offer with which a user has transacted, or the like. In one embodiment, a provider of an offer may identify one or more competitors for the prompt module 324 to use in a competitor metric, or the like. In a further embodiment, the prompt module 324 may automatically determine one or more competitors for a provider of an offer based on a transaction category of the provider and/or the offer.

A transaction metric, in one embodiment, comprises a lifetime value metric indicating a projected total value of a user to a provider of an offer as a customer, an amount of time until a provider of an offer is projected to break even on the offer with a user as a customer (e.g., based on the user's financial transaction data and on a cost of the offer to the provider), or the like. For example, the prompt module 324 may determine and/or estimate, based on a user's financial transaction data, an amount the user is likely to spend on goods and/or services provided by a provider of an offer, how loyal a user is likely to be to a provider of an offer, or the like, and may determine a lifetime value metric based on one or more of the foregoing determinations.

A transaction metric, in certain embodiments, comprises a total spend metric indicating a confidence of whether a user's financial transaction data (e.g., aggregated as described above, based on transactions made by the payment module 104, or the like) includes each of the user's financial transactions, aggregated from multiple entities (e.g., financial institutions 114 or other third-party entities 108 such as banks, credit unions, credit card companies or other lenders, payment processing companies, online payment providers, or the like). If there is a low confidence or probability that the prompt module 324 has access to each of the user's financial transactions (e.g., a complete and/or substantially complete financial snapshot for the user), it may be unlikely that the prompt module 324's determination of whether the user's financial transaction data satisfies a transaction metric associated with an offer is accurate, and a provider of an offer may therefore find the user a poor candidate for the offer, due to the uncertainty of whether the user's financial transaction data is complete. Conversely, if there is a high confidence or probability that the prompt module 324 has access to each of a user's financial transactions (e.g., a complete and/or substantially complete financial snapshot for the user), a provider of an offer may have greater trust in the prompt module 324's selection of the user, and may provide the offer to the user with greater certainty.

The prompt module 324, in certain embodiments, may analyze and/or process a user's financial transaction data using one or more rules, flags, indicators, or the like, to determine a total spend metric indicating a confidence of whether the user's financial transaction data includes each of the user's financial transactions (e.g., over a predefined period). For example, in one embodiment, the prompt module 324 may start at a default confidence level (e.g., 50%, 0.5, 0%, 0, 100%, 1, or the like) and may adjust the confidence level for a user's financial transaction data based on one or more confidence factors. The prompt module 324, in certain embodiments, may decrease a confidence level if one transaction type in a transaction type pair (e.g., two types of transactions that are often seen together within a predefined period) is missing, may increase a confidence level if both transaction types in a transaction type pair are present, or the like. For example, a transaction type pair may include a mortgage payment and a utility payment; a payment credit on a credit card statement and a corresponding debit from a bank account; a car payment and fuel purchases; and/or another transaction type pair.

In a further embodiment, the prompt module 324 may increase a confidence level of a total spend metric if one or more predefined key transactions are present, and/or may decrease a confidence level of a total spend metric if one or more predefined key transactions are not present in the financial transaction data of a user. A key transaction, in one embodiment, comprises a transaction that is expected to occur for each user within a predefined period. For example, a key transaction may comprise a direct deposit and/or payroll check deposit, a mortgage and/or rent payment, at least a threshold amount spent on a personal necessity (e.g., food), and/or another expected transaction. In certain embodiments, the prompt module 324 may be configured to prompt a user to add one or more additional accounts in response to determining a confidence level below a threshold for a total spend metric for the user. In another embodiment, the prompt module 324 may query a user whether the user's financial transaction data includes each of the user's financial transactions, and may base a confidence level of a total spend metric on the user's answer.

The prompt module 324, in one embodiment, may determine a confidence level of a total spend metric and/or another transaction metric by processing users' financial transaction data using one or more predefined rules, or the like. In a further embodiment, the prompt module 324 may determine a confidence level of a total spend metric and/or another transaction metric dynamically, using machine learning or other artificial intelligence, or the like, causing an accuracy of the prompt module 324's determinations to increase over time (e.g., at least up to a point) as the prompt module 324 learns from and detects patterns in the financial transaction data.

A transaction metric, in certain embodiments, may comprise a transaction interval metric indicating an amount of time spanned by a user's financial transaction data (e.g., one month, two months, three months, six months, a year, two years, three years, or the like). For example, in one embodiment, a provider of an offer for a long term or large purchase, that is not an impulse purchase, may prefer to present the offer to one or more users with a higher transaction interval metric (e.g., with a longer amount of time spanned by the users' financial transaction data), while a provider of an offer for a smaller purchase, such as an impulse purchase, may not have such a preference and my provide its offer to users with a lower transaction interval metric (e.g., with a shorter amount of time spanned by the users' financial transaction data).

In certain embodiments, the prompt module 324 may provide an interface (e.g., a graphical user interface (GUI), an API, a command line interface (CLI), or the like) for a merchant 108 to set one or more thresholds whereby a user's financial transaction data may satisfy a transaction metric for an offer from the merchant 108. By setting one or more thresholds whereby a user's financial transaction data may satisfy a transaction metric, a merchant 108 or other provider of an offer may target certain users for the offer based on the users' financial transaction history. For example, a provider of an offer may define a transaction metric (e.g., one or more thresholds of a transaction metric) requiring that users who receive the offer own a vehicle, spend at least a selected percentage of the user's income in a selected geographical region, earn at least a selected amount per year, have at least six months of financial transaction data available to the prompt module 324, have spent at least a selected amount at one of two of the provider's competitors, and have at least a 75% confidence level that the user's financial transaction data includes all of the user's financial transactions. The prompt module 324, in one embodiment, may allow a provider of an offer to select a cap and/or a minimum on a number of users that will receive the offer, to adjust one or more thresholds of a transaction metric until at least a minimum number of users are selected, or the like. In this manner, in certain embodiments, a provider of an offer may target the offer to users most likely to benefit from and/or accept the offer, based on the users' own financial transaction data, aggregated from multiple sources.

In a further embodiment, the prompt module 324 may use a transaction metric to compare one or more available offers for a user to determine a benefit of the offers to the user based on the user's financial transaction data. For example, the prompt module 324 may select a user to receive an offer for an auto loan with a lower interest rate than the user's current auto loan interest rate, determined based on the user's financial transaction data, which may save the user money on their loan payment each month. Similarly, in another example, the prompt module 324 may select the user to receive an offer to switch to a different mortgage company offering mortgage rates of 3.5% based on user's current mortgage interest rate of 4.0%. Other offers may include potential benefits such as lower interest rates, lower fees, higher investment rates, shorter payment schedules, discounts, promotions, coupons, an early loan payoff, a balance transfer, or the like.

In some embodiments, the available offers may be posted or otherwise made available by a third-party system of an advertiser, promoter, or the like (e.g., a provider of an offer). If there are multiple offers available to a user, the prompt module 324 may select the best offer for the user. The best offer may be the offer that provides the greatest benefit to the user in terms of a discount, monthly payment, interest rate, or the like, in terms of the user's financial goals, as described below, or the like. In a further embodiment, the prompt module 324 may present a plurality of the multiple offers available to the user so that the user may choose to accept one or more of the available offers.

In some embodiments, the prompt module 324 selects a user for an offer based on the user's purchase history, determined from the user's financial transaction data. For example, the prompt module 324 may determine that the user spends at least $100 a month on home improvement goods. Accordingly, the prompt module 324 may select the user for offers providing discounts, promotions, coupons, or the like, on home improvement items. Similarly, the prompt module 324 may select the user for offers providing discounts, promotions, coupons, or the like on home improvement items from a particular home improvement retailer, vendor, store, or the like.

In one embodiment, the prompt module 324 selects a user for an offer based on one or more financial transactions of other users (e.g., one or more other users which the prompt module 324 determines have similar interests and/or purchasing habits, based on the users' financial transaction data). The prompt module 324 may select a user for an offer associated with a transaction that is present in the financial transaction data for the one or more other users (e.g., with similar interests and/or spending habits) but not yet present in the selected user's financial transaction data, acting as a recommendation engine allowing the selected user to discover something new that other similar users already enjoy. For example, the prompt module 324, based on a user's financial transaction data, may determine that a user purchases certain items regularly. The prompt module 324 may also determine that one or more other users have recently purchased similar items based on their financial transaction data. Accordingly, the prompt module 324 may select the user to receive an offer for the items that the other users have purchased based on the other users' financial transaction data (e.g., the offer may include a message such as "Users like you have recently purchased these products from these retailers. Buy now and save 5%," or the like).

In a further embodiment, the prompt module 324 selects a user for an offer based on the user's search history, web browsing history, cookies, or the like, which may be stored along with the user's financial transaction data (e.g., on a mobile device 102, or another hardware computing device 102 of a user), with consent from the user. For example, the prompt module 324 may determine that the user has searched for new vehicles over the past week, and, based on the search history data, may select the user to receive one or more offers from various new and/or used car dealers, banks offering deals for auto loans, deals from car insurance companies, or the like. In certain embodiments, the prompt module 324 may select a category for an offer based on a user's search history, and may select the user for a specific offer within the category based on the user's financial transaction data, as described above. In one embodiment, the prompt module 324 may select a user for an offer in response to both the user's search history data satisfying a search metric associated with the offer (e.g., the user has searched for a selected term within a selected time period) and the user's financial transaction data satisfying a transaction metric, as described above.

In certain embodiments, the offer may comprise an offer that the offer provider has paid to have a priority over one or more other offer that were not paid, and/or that paid less. For example, the prompt module 324 may select a user for a car insurance offer. The car insurance offer may be an offer paid for by a car insurance company such that the offer may have a higher priority than one or more different offers that were not paid for by other car insurance companies, or for which the other car insurance companies paid less.

In one embodiment, the prompt module 324 selects a user for an offer based on the user's schedule, which may be stored along with the user's financial transaction data (e.g., on a mobile device 102, or another hardware computing device 102 of a user), with the user's consent. In certain embodiments, the user's schedule is determined from a calendar associated with the user, location information associated with the user, or the like. For example, the prompt module 324 may determine that the user drives past a certain restaurant every evening on their way home from work, based on GPS data or other location data for the user. Accordingly, the prompt module 324 may select the user to receive a coupon redeemable at the restaurant. The prompt module 324, in some embodiments, selects the user to receive offers associated with holidays, birthdays, vacations, or other events as determined from the user's schedule.

In one embodiment, at least a portion of the prompt module 324 is located on a user's hardware computing device 102, and receives an offer for the user in response to the location data that the location module 322 provides satisfying a target location for the offer. The prompt module 324 may receive the offer via a data network 106, an email, a text message, an instant message protocol, a social media network, a website, a web browser plug-in, a mobile application, a push notification, an API, or the like. In such an embodiment, the prompt module 324 may present the offer on an electronic display screen of the user's hardware computing device 102, or the like.

In one embodiment, the prompt module 324 is configured to electronically assist the user to accept the offer. In certain embodiments, the prompt module 324 electronically assists the user to accept the offer by pre-populating one or more data fields with the user's identification and financial data. For example, the prompt module 324 may prepopulate one or more web forms with the user's information, such as the user's contact information, payment information, billing information, or the like, in response to the user accepting an offer.

In certain embodiments, the prompt module 324 accesses the user's identification and financial data from a database of a backend server 110, a third-party entity 108, or the like in order to facilitate acceptance of the offer. For example, the user may provide credentials to the prompt module 324, such as a username and password, a pass phrase, a PIN number, an access number, or the like, which the prompt module 324 may use to access the user's data securely stored by a backend server 110, a third-party entity 108, or the like. In this manner, the user does not have to manually enter their contact information and/or billing information, for example, to complete acceptance of the offer, which may increase the likelihood that the user will complete the financial transaction associated with the offer.

The prompt module 324, in one embodiment, is configured to verify the user completed a financial transaction associated with the offer based on subsequent financial transaction data received for the user. For example, the prompt module 324 may verify that the payment module 104 completes a transaction associated with the offer, the prompt module 324 may check a user's financial transaction data (e.g., aggregated bank account and/or credit card statements) after the user was presented with an offer to determine whether the user made any payments associated with the offer, or the like.

In a further embodiment, the prompt module 324 verifies the user completed a financial transaction associated with a coupon, promotion, or discount by determining that a financial transaction associated with the offer shows that the coupon, promotion, or discount was used or applied to the purchase price. For example, the prompt module 324 may verify that the user bought a product advertised with a 20% discount by determining the 20% discount was applied to a subsequent financial transaction associated with the product. In this manner, the prompt module 324 may determine whether an offer was effective as an incentive for the user to purchase the product.

In one embodiment, the prompt module 324 determines which of one or more different offers presented to one or more users is more effective. For example, the prompt module 324 may perform A/B testing, or a similar statistical experiment, where two or more different offers, versions of an offer, or the like are presented to a user and/or to various users, as selected based on the users' financial transaction data, to determine which offers or versions of an offer are more effective. For example, two different versions of an offer may be identical except for a variation that might affect a user's behavior, such as a different discount amount, a different interest rate, different advertising text, a different image, or the like. In another example, two different offers may be identical except for the method of delivery—one offer may be sent to a user via email while the other offer may be sent via a text message, or the like. The prompt module 324 may determine an offer's effectiveness according to a transaction amount associated with each offer, which may include a number of users that redeem an offer, a number of offers that were accepted, an amount of money spent associated with an offer, or the like as determined by subsequent financial transaction data for one or more users. Accordingly, the prompt module 324 may determine that the more effective offer is the offer associated with the highest transaction size and/or amount.

In a further embodiment, the prompt module 324 allows a provider of an offer to test or sample an offer based on a transaction metric. For example, the prompt module 324 may select a sample number of users of a size selected by a provider of an offer and the prompt module 324 may verify which users of the sample completed a financial transaction associated with the offer and provide an indication of a percentage of the plurality of users selected as the sample which completed a financial transaction associated with the offer to the provider. If the provider is satisfied with the results from the prompt module 324, the provider may run a larger campaign to provide the offer to more users. Otherwise, the provider may change or adjust the offer and run another sample test, or the like.

The prompt module 324, in one embodiment, is configured to determine one or more financial goals and/or budgets of the user. The user, for example, may setup various financial goals using the payment module 104, such as budgets or spending goals (e.g., grocery budgets, entertainment budgets, gas budgets, or the like), debt payoff goals, retirement goals, large purchase goals (e.g., save to purchase a vehicle, home, or other large purchase in a selected amount of time), home improvement goals, or the like. The goals may be stored securely with the user's financial transaction data, the user's identification data, or the like. In one example, as a user is walking into a home improvement store the prompt module 324 may provide an offer to the user, which the interface module 313 may present to the user, that provides a discount to the user for various home improvement products based on the user's home improvement goal, or the like. For instance, the prompt module 324 may determine that the user has not reached their predefined budget for home improvement spending for the month. Accordingly, based on the user's financial goal data, the prompt module 324 may select the user for home improvement offers, which may be provided to the user in response to location data from one or more sensors indicating the user's location satisfies a target location of an offer.

In certain embodiments, the prompt module 324 customizes one or more content elements of an offer based on the user's financial goals. The content elements may include text, graphics, images, animations, videos, audio tracks, or the like. Continuing with the previous example, the prompt module 324 may customize the text of the home improvement offer to reflect the user's budget for home improvement goods. For instance, the offer text may recite "It's almost the end of the month, and you haven't reached your home improvement monthly budget of $100. Here is a 20% discount coupon good on home improvement products."

Figure 4:
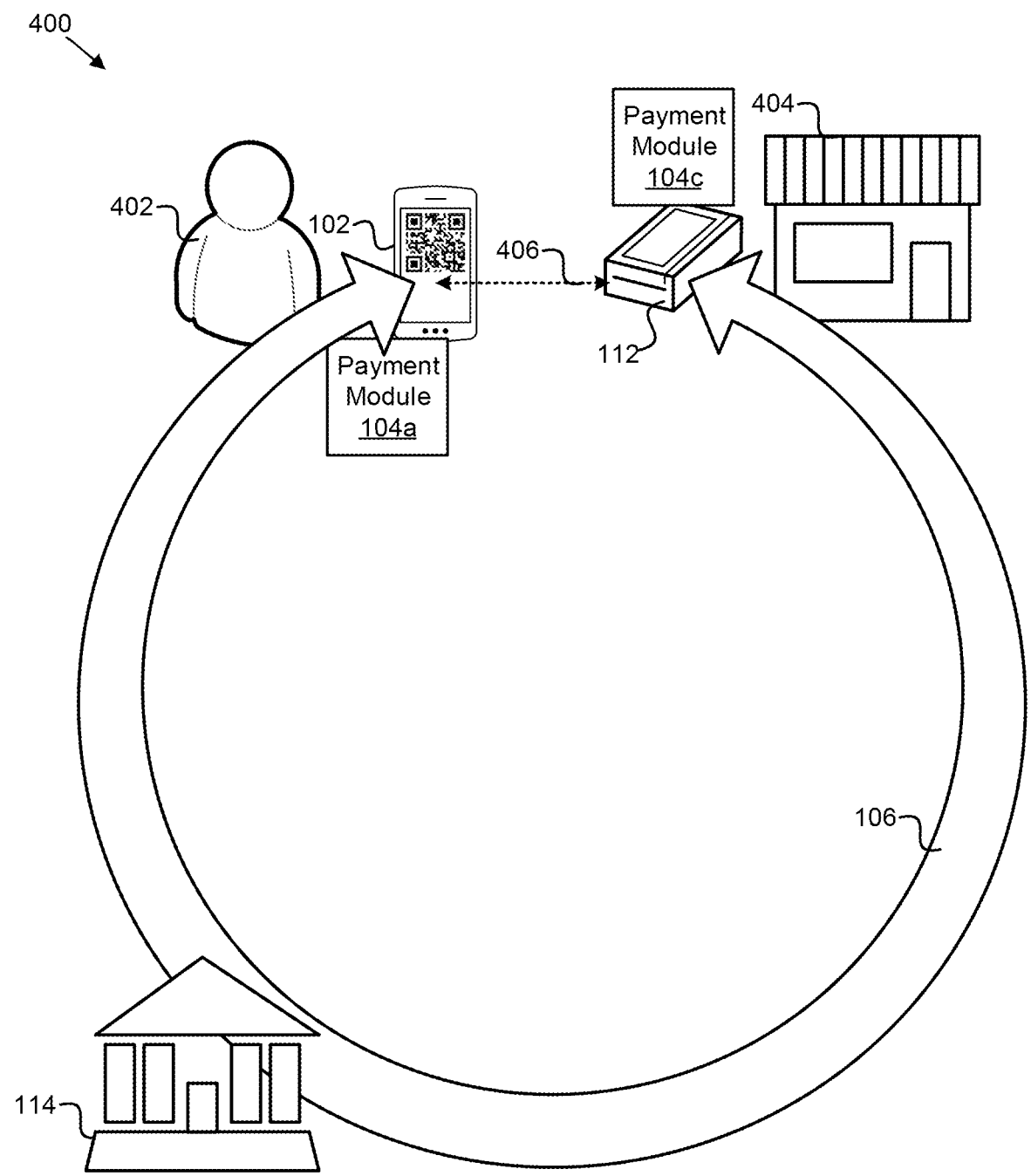
FIG. 4 is a schematic block diagram illustrating an additional embodiment of a system for payment processing.

FIG. 4 depicts one embodiment of a system 400 for payment processing. The system 400, in the depicted embodiment, includes a mobile hardware computing device 102 for a user 402, a hardware payment terminal 112 for a merchant 404, a data network 106, and a third-party institution 114 (e.g., a financial institution 114 or the like). The mobile hardware computing device 102, in the depicted embodiment, includes a user payment module 104*a* and the hardware payment terminal 112 includes a merchant payment module 104*c*, in communication with each other over a wireless connection 406.

In the depicted embodiment, a purchase or other financial transaction between the user 402 and the merchant 404 may be based on an identity and/or account of the user 402, authenticated and/or verified by the user payment module 104*a* on the mobile hardware computing device 102 of the user prior to the transaction, rather than being based on a credit, debit, or other payment card (e.g., either physical or virtual/tokenized).

In the depicted embodiments, a payment module 104 may verify or validate an availability of funds for a transaction electronically, directly with a third-party institution 114 for the user 402 (e.g., using an API, an HTML web interface, or other direct electronic interface with the third-party institution 114). In response to successfully validating an availability of funds for a transaction, in the depicted embodiment, a payment module 104 may directly transfer the funds electronically, using an ETF, an ACH electronic payment, an RTGS transfer, a wire transfer, a giro transfer, an internal transfer between accounts within the third-party institution 114, a digital wallet, an account credit, a digital currency such as a cryptocurrency and/or blockchain payment, or the like. Other card-based payment networks may require additional entities, such as an acquiring financial institution for a merchant 404, to contact an issuing financial institution for a payment card of a user 402 to validate and transfer funds, using a legacy card-based payment network as an intermediary, with resulting interchange fees and long float times before receiving payment, in contrast to the direct electronic validation and funds transfer of the system 400 using the data network 106 to access a direct electronic interface for the third-party institution 114 to validate availability of and electronically transfer funds.

In the depicted embodiment, the user payment module 104*a* displays a QR code on an electronic display screen of the mobile hardware computing device 102 of the user 402, and the wireless connection 406 comprises a merchant payment module 104*c* detecting and decoding the QR code using a camera or other optical sensor of a hardware payment terminal 112 for the merchant 404, in order to exchange payment information. In other embodiments, the wireless connection 406 may include an at least partially wireless data network 106, an NFC connection, a Bluetooth® connection, a Wi-Fi or other 802.11 protocol connection, an RFID connection, an IR signal protocol connection, an RF signal protocol connection, another type of matrix or barcode, payment information encoded in another visually encoded representation (e.g., a matrix, a barcode, an image, an animation, a video), or the like.

Figure 5A:
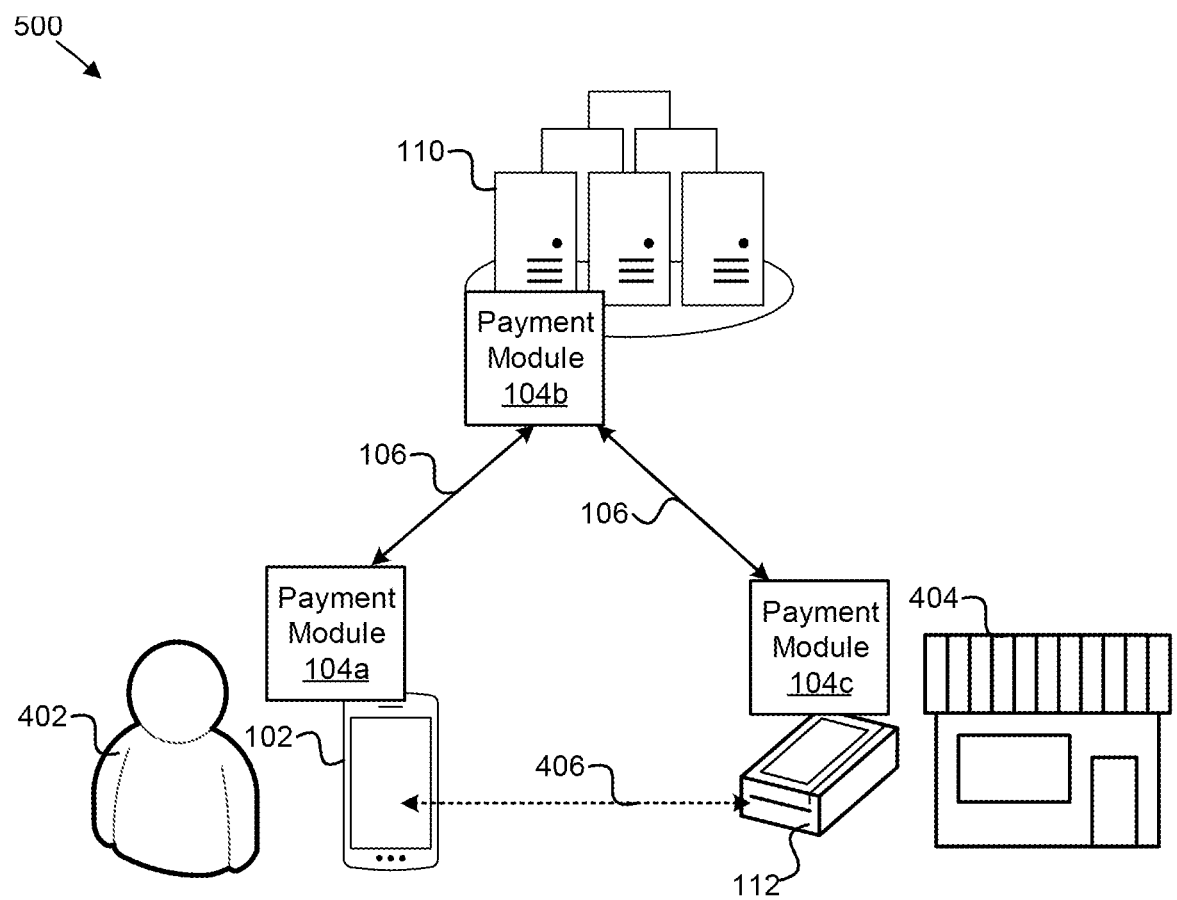
FIG. 5A is a schematic block diagram illustrating a certain embodiment of a system for payment processing.

FIG. 5A depicts one embodiment of a system 500 for payment processing. In the depicted embodiment, instead of or in addition to a direct wireless connection 406, both a user payment module 104*a* and a merchant payment module 104*c* are in communication with the same backend payment module 104*b*, disposed on a backend server computing device 110, or the like. The backend payment module 104*b*, in various embodiments, may cooperate with the user payment module 104*a* and/or the merchant payment module 104*c* to exchange payment information between them, to validate an availability of funds with a third-party institution 114, to electronically transfer the funds from an account for the user 402 to an account for the merchant 404, or the like.

Figure 5B:
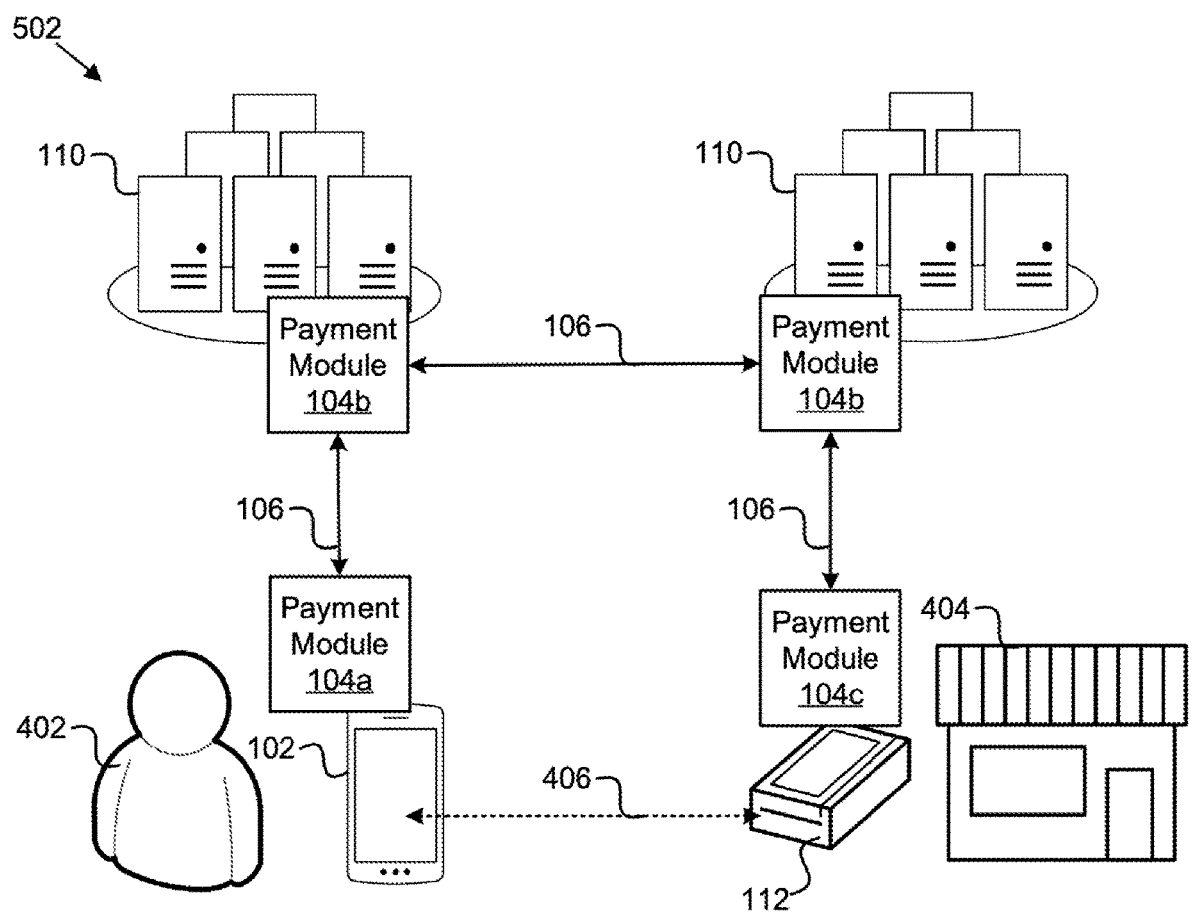
FIG. 5B is a schematic block diagram illustrating another embodiment of a system for payment processing.

FIG. 5B depicts one embodiment of a system 502 for payment processing. In the depicted embodiment, instead of or in addition to a direct wireless connection 406, a user payment module 104*a* and a merchant payment module 104*c* are in communication with different backend payment modules 104*b*, disposed on different backend server computing devices 110, or the like (e.g., a first backend payment module 104*b* for the user 402, for a user payment module 104*a*, or the like and a second backend payment module 104*b* for the merchant 404, for a merchant payment module 104*c*, or the like). The backend payment modules 104*b*, in various embodiments, may be in communication with each other to exchange payment information between them, to validate an availability of funds with a third-party institution 114, to electronically transfer the funds from an account for the user 402 to an account for the merchant 404, or the like. Other embodiments may have different amounts and arrangements of payment modules 104*a*, 104*b*, 104*c* and backend server computing devices 110.

Figure 6:
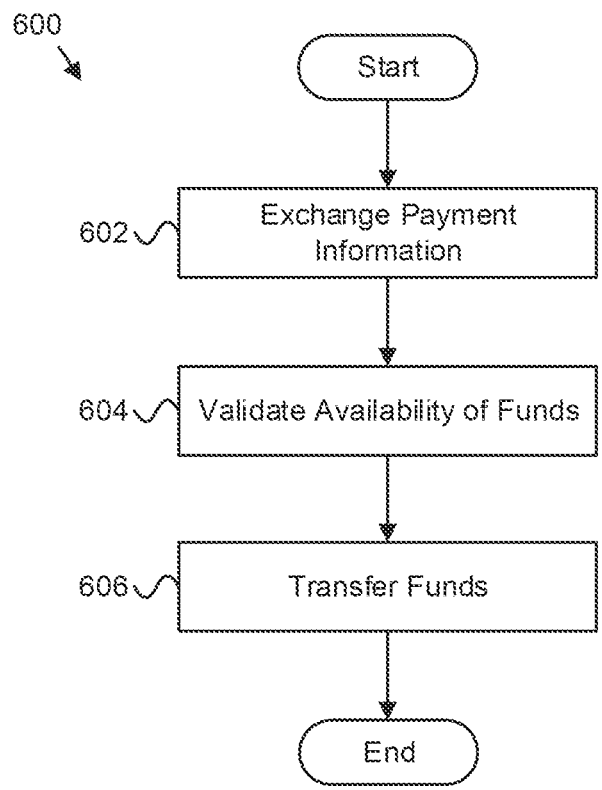
FIG. 6 is a schematic flow chart diagram illustrating one embodiment of a method for payment processing.

FIG. 6 depicts one embodiment of a method 600 for payment processing. The method 600 begins and an exchange module 202 exchanges 602 payment information for a transaction electronically between a hardware computing device 102 for a user 402 and a hardware payment device 112 for a merchant 108, 404. A validation module 204 validates 604 an availability of funds for the transaction using an electronic interface for an account for the user 402 at a third-party institution 114. A transfer module 206 electronically transfers 606 the funds directly from the account for the user 402 to an account for the merchant 108, 404 to complete the transaction and the method 600 ends.

Figure 7:
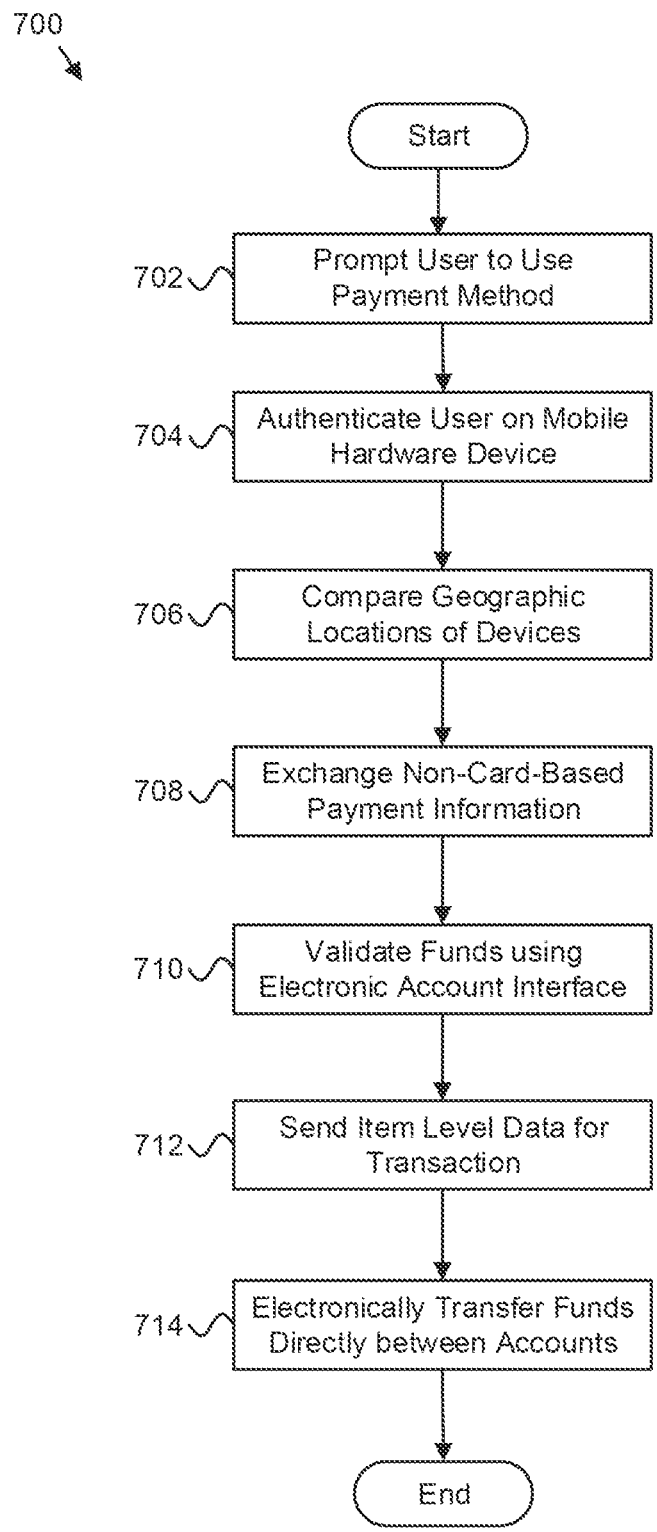
FIG. 7 is a schematic flow chart diagram illustrating a further embodiment of a method for payment processing.

FIG. 7 depicts one embodiment of a method 700 for payment processing. The method 700 begins and a prompt module 324 prompts 702 a user 402 to use a predefined payment method. An authentication module 301 authenticates 704 the user 402 on a mobile hardware device 102 for the user 402. A location module 322 compares 706 determined geographic locations for the mobile hardware device 102 for the user 402 and for a merchant 108, 404 and/or a hardware payment device 112.

An exchange module 202 exchanges 708 non-card-based payment information for a transaction electronically between the mobile hardware computing device 102 for the user 402 and a hardware payment device 112 for a merchant 108, 404. A validation module 204 validates 710 an availability of funds for the transaction using an electronic interface for an account for the user 402 at a third-party institution 114. A transfer module 206 electronically transfers 714 the funds directly from the account for the user 402 to an account for the merchant 108, 404 to complete the transaction and the method 700 ends.

Figure 8:
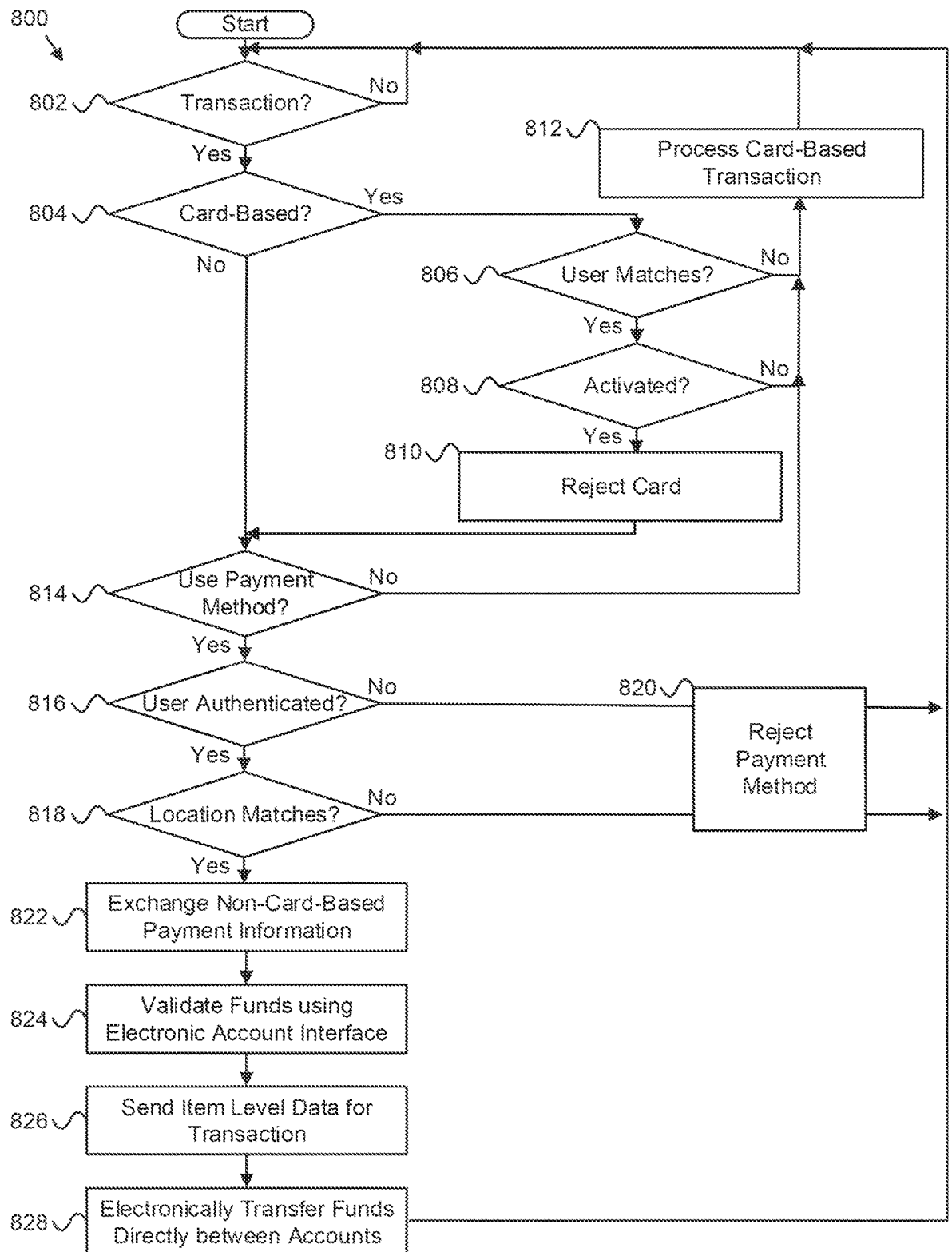
FIG. 8 is a schematic flow chart diagram illustrating an additional embodiment of a method for payment processing.

FIG. 8 depicts one embodiment of a method 800 for payment processing. The method 800 begins and a payment module 104 determines 802 whether a user 402 has initiated a transaction from a hardware computing device 102. In response to the payment module 104 determining 802 that the user 402 has initiated a transaction, a hardware payment device 112 and/or a backend server 110 for a third-party institution 114 determines 804 whether the initiated transaction is card-based. If the hardware payment device 112 and/or the backend server 110 for the third-party institution 114 determines 804 that the initiated transaction is card-based, the hardware payment device 112 and/or the backend server 110 for the third-party institution 114 determines 806 whether the presented card matches a known user 402, and if so, determines 808 whether the known user 402 has activated an account and/or application associated with the payment module 104, and if so, rejects the presented card in order to prompt 814 the known user 402 to use a non-card-based payment method of the payment module 104. If the presented card does not match a known user 402 or if the user 402 has not yet activated an account and/or application associated with the payment module 104, the hardware payment device 112 and/or the backend server 110 for the third-party institution 114 processes 812 a card-based transaction and the payment module 104 continues to monitor 802 for new transactions.

A prompt module 324 prompts 814 the user 402 to use a non-card-based payment method of the payment module 104. If the user 402 rejects the prompt 814, the payment module 104 processes 812 a card-based transaction (e.g., in response to the user resubmitting a card-based payment, or the like). If the user 402 accepts the prompt 814 to use the non-card-based payment method of the payment module 104, the authentication module 301 authenticates 816 the user 402 and the location module 322 determines 818 if a location for the hardware computing device 102 for the user 402 matches a location for the merchant 108, 404 and/or a hardware payment device 112, 108 for the merchant 108, 404. If the user 402 fails to properly authenticate 816 or if the locations fail to match 818, the payment module 104 rejects 820 the non-card-based payment method.

An exchange module 202 exchanges 822 non-card-based payment information for the transaction electronically between the hardware computing device 102 for the user 402 and the hardware payment device 112 for the merchant 108, 404. A validation module 204 validates 824 an availability of funds for the transaction using an electronic interface for an account for the user 402 at the third-party institution 114. An item level data module 320 sends 826 item level data for the transaction from the hardware payment device 112 for the merchant 108, 404 to the hardware computing device 102 for the user 402. A transfer module 206 electronically transfers 828 the funds directly from the account for the user 402 to an account for the merchant 108, 404 to complete the transaction and the payment module 104 continues to monitor 802 for new transactions.

A means for exchanging payment information for a transaction electronically between a hardware computing device 102 for a user 402 and a hardware payment device 112 for a merchant 108, 404, in various embodiments, may include one or more of a hardware computing device 102, a hardware payment device 112 (e.g., a hardware payment terminal 112 and/or a hardware payment server device 112), a data network 106, a wireless connection 406, an NFC device, a visually encoded representation (e.g., a QR code matrix, a barcode, an image, an animation, a video, or the like), a one-time-use code, a Bluetooth® device, a Wi-Fi device, an RFID device, an IR device, an RF device, a backend server 110, a payment module 104, an exchange module 202, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, an electronic display screen, a camera or other optical sensor, an antenna, a transmitter, a receiver, a transceiver, other logic hardware, and/or other executable code stored on a computer readable storage medium. Other embodiments may include similar or equivalent means for exchanging payment information for a transaction electronically between a hardware computing device 102 for a user 402 and a hardware payment device 112 for a merchant 108, 404.

A means for validating an availability of funds for a transaction using an electronic interface for an account for a user 402 at a third-party institution 114, in various embodiments, may include one or more of a payment module 104, a validation module 204, an access module 307, an API, an HTML, web interface, a data network 106, a hardware computing device 102, a backend server 110, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, and/or other executable code stored on a computer readable storage medium. Other embodiments may include similar or equivalent means for validating an availability of funds for a transaction using an electronic interface for an account for a user 402 at a third-party institution 114.

A means for electronically transferring funds directly from an account for a user 402 to an account for a merchant 404 to complete a transaction, in various embodiments, may include one or more of an electronic funds transfer (ETF), an automatic clearing house (ACH) electronic payment, a real-time gross settlement (RTGS) electronic transfer, an electronic wire transfer, an electronic giro transfer, an internal transfer within a third-party institution 114, an account credit, a digital wallet, a digital currency source such as a cryptocurrency and/or blockchain payment source, a data network 106, an API, an HTML web interface, a hardware computing device 102, a backend server 110, a payment module 104, a transfer module 206, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, and/or other executable code stored on a computer readable storage medium. Other embodiments may include similar or equivalent means for electronically transferring funds directly from an account for a user 402 to an account for a merchant 404 to complete a transaction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising: one or more processors; one or more memories that store code executable by the one or more processors to:
- detect, using one or more sensors of the apparatus, that a user is physically located within a predefined distance of a merchant;
- detect that the user is attempting payment with a payment card for a transaction at the merchant;
- determine that the user has an account for a non-card based payment method that is associated with the payment card by matching the payment card with the account for the non-card-based payment method in response to detecting that the user is attempting payment with the payment card for the transaction at the merchant;
- reject payment with the payment card in response to determining the account for the non-card-based payment method;
- prompt the user to use the account for the non-card-based payment method as a funding source for the transaction prior to the transaction;
- in response to detecting the user's physical location and in response to the user accepting the prompt to use the non-card-based payment method:
- determine the user's previously-stored electronic credentials for accessing the account at a third-party institution via an application programming interface or a hypertext markup language web interface for the third-party institution;
- pre-validate an availability of funds for the account of the user at the third-party institution by using the user's previously-stored electronic credentials to electronically access funds information for the user's account and estimating a likelihood that the user will be able to pay for the transaction using the account for the user based on aggregated financial transactions for the user from the account for the user and one or more additional accounts for the user, wherein estimating the likelihood that the user will be able to pay for the transaction using the account is in response to a network connection being offline, the aggregated financial transactions for the user are stored offline on the mobile hardware computing device of the user, and the transaction is queued for a period of time until the network connection is online and the funds are electronically transferred using the online connection;
- exchange payment information for the transaction wirelessly between the mobile hardware computing device of the user and the hardware payment terminal for the merchant via one or more of a scan of a visually encoded representation, a near-field communication protocol, a one-time-use code, or an at least partially wireless communication network; and
- electronically transfer the funds directly from the account for the user to an account for the merchant to complete the transaction in response to verifying that the user has funds available to complete the transaction.

2. The apparatus of claim 1, wherein the exchanged payment information comprises an amount for the transaction and an identifier for one or more of the users, the account for the user, the merchant, and the account for the merchant without any indicator of a payment card.

3. The apparatus of claim 1, wherein the direct transfer from the account for the user to the account for the merchant comprises one or more of an electronic funds transfer (ETF), an automatic clearing house electronic payment, a real-time gross settlement electronic transfer, an electronic wire transfer, an electronic giro transfer, and an internal transfer within the third-party institution.

4. The apparatus of claim 1, wherein the exchanged payment information comprises item level data for the transaction comprising identifiers of a plurality of items purchased in the transaction and costs for the items.

5. The of claim 1, wherein the code is further executable by the one or more processors to compare a geographic location determined based on a sensor for the mobile hardware computing device with a geographic location for the hardware payment terminal to validate an authenticity of the transaction.

6. The apparatus of claim 1, wherein the prompt is to the merchant on an electronic display screen in communication with the hardware payment terminal, the prompt to verbally suggest to the user to use the non-card-based payment method for the user as the funding source.

7. The apparatus of claim 1, wherein the prompt is in response to a location sensor determining the mobile hardware computing device is within a predefined distance of the merchant.

8. The apparatus of claim 1, wherein the prompt includes an offer for an incentive for the user to use the non-card-based payment source for the user as the funding source.

9. The apparatus of claim 1, wherein the code is further executable by the one or more processors to authenticate the user on the mobile hardware computing device prior to exchanging the payment information.

10. The apparatus of claim 1, wherein the one or more processors and the one or more memories are disposed on one or more of the hardware payment terminals, a server computing device for the hardware payment terminal, the mobile hardware computing device, and a server computing device for the mobile hardware computing device.

11. A method, comprising:
- detecting, using one or more sensors, that a user is physically located within a predefined distance of a merchant;
- detecting that the user is attempting payment with a payment card for a transaction at the merchant;
- determining that the user has an account for a non-card-based payment method that is associated with the payment card by matching the payment card with the account for the non-card-based payment method in response to detecting that the user is attempting payment with the payment card for the transaction at the merchant;
- rejecting payment with the payment card in response to determining the account for the non-card-based payment method;
- prompting the user to use the account for the non-card-based payment method as a funding source for the transaction prior to the transaction;
- in response to detecting the user's physical location and in response to the user accepting the prompt to use the non-card-based payment method:
- determining the user's previously-stored electronic credentials for accessing the account at a third-party institution via an application programming interface or a hypertext markup language web interface for the third-party institution;

pre-validating an availability of funds for the account of the user at the third-party institution by using the user's previously-stored electronic credentials to electronically access funds information for the user's account via one or more of an application programming interface and a hypertext markup language web interface for the third-party institution and estimating a likelihood that the user will be able to pay for the transaction using the account for the user based on aggregated financial transactions for the user from the account for the user and one or more additional accounts for the user, wherein estimating the likelihood that the user will be able to pay for the transaction using the account is in response to a network connection being offline, the aggregated financial transactions for the user are stored offline on the mobile hardware computing device of the user, and the transaction is queued for a period of time until the network connection is online and the funds are electronically transferred using the online connection;

exchanging non-card-based payment information for the transaction between the hardware computing device of the user and the hardware payment device for the merchant via one or more of a scan of a visually encoded representation, a near-field communication protocol, a one-time-use code, or an at least partially wireless communication network; and electronically transferring the funds directly from the account for the user to an account for the merchant to complete the transaction in response to verifying that the user has funds available to complete the transaction; and in response to the user rejecting the prompt to use the non-card-based payment method, resubmitting payment with the payment card for completing the transaction.

12. The method of claim 11, further comprising: authorizing a second card-based payment attempt from the user at the hardware payment device in response to the user rejecting the prompt to use the account for the user in the payment application.

13. An apparatus, comprising:
means for detecting, using one or more sensors, that a user is physically located within a predefined distance of a merchant;
means for detecting that the user is attempting payment with a payment card for a transaction at the merchant;
means for determining that the user has an account for a non-card-based payment method that is associated with the payment card by matching the payment card with the account for the non-card-based payment method in response to detecting that the user is attempting payment with the payment card for the transaction at the merchant;
means for rejecting payment with the payment card in response to determining the account for the non-card-based payment method;
means for prompting the user to use the account for the non-card-based payment method as a funding source for the transaction prior to the transaction;
in response to detecting the user's physical location and in response to the user accepting the prompt to use the non-card-based payment method:
means for determining the user's previously-stored electronic credentials for accessing the account at a third-party institution via an application programming interface or a hypertext markup language web interface for the third-party institution;
means for pre-validating an availability of funds for the account of the user at the third-party institution by using the user's previously-stored electronic credentials to electronically access funds information for the user's account and estimating a likelihood that the user will be able to pay for the transaction using the account for the user based on aggregated financial transactions for the user from the account for the user and one or more additional accounts for the user, wherein estimating the likelihood that the user will be able to pay for the transaction using the account is in response to a network connection being offline, the aggregated financial transactions for the user are stored offline on the mobile hardware computing device of the user, and the transaction is queued for a period of time until the network connection is online and the funds are electronically transferred using the online connection;
means for exchanging payment information for the transaction electronically between the hardware computing device of the user and the hardware payment device for the merchant via one or more of a scan of a visually encoded representation, a near-field communication protocol, a one-time-use code, or an at least partially wireless communication network; and
means for electronically transferring the funds directly from the account for the user to an account for the merchant to complete the transaction in response to verifying that the user has funds available to complete the transaction; and
in response to the user rejecting the prompt to use the non-card-based payment method, means for resubmitting payment with the payment card for completing the transaction.

* * * * *